United States Patent
Ormond

(10) Patent No.: US 12,190,421 B2
(45) Date of Patent: Jan. 7, 2025

(54) MAP LABEL LOCATION ADJUSTMENT

(71) Applicant: THE BOEING COMPANY, Chicago, IL (US)

(72) Inventor: Shawn Eric Ormond, Commerce City, CO (US)

(73) Assignee: THE BOEING COMPANY, Arlington, VA (US)

( * ) Notice: Subject to any disclaimer, the term of this patent is extended or adjusted under 35 U.S.C. 154(b) by 122 days.

(21) Appl. No.: 18/068,629

(22) Filed: Dec. 20, 2022

(65) Prior Publication Data

US 2024/0203004 A1 Jun. 20, 2024

(51) Int. Cl.
*G06T 11/60* (2006.01)
*G01C 21/36* (2006.01)
*G06T 3/40* (2006.01)

(52) U.S. Cl.
CPC ............... *G06T 11/60* (2013.01); *G06T 3/40* (2013.01); *G01C 21/3673* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 5,684,940 A * | 11/1997 | Freeman ............... | G06T 11/206 345/677 |
| 9,396,697 B2 * | 7/2016 | Adlers ............... | G01C 21/3673 |
| 10,489,954 B1 * | 11/2019 | Loer ................... | G01C 21/3881 |
| 10,769,346 B1 * | 9/2020 | Yu .......................... | G06F 3/0486 |
| 10,809,090 B2 | 10/2020 | Cai et al. | |
| 2005/0137791 A1 * | 6/2005 | Agrawala ............... | G06T 11/60 701/454 |
| 2006/0279432 A1 * | 12/2006 | Mori ...................... | G01C 21/26 340/995.15 |
| 2010/0246996 A1 * | 9/2010 | Yamamoto ............... | G06T 11/60 382/282 |

(Continued)

FOREIGN PATENT DOCUMENTS

| | | |
|---|---|---|
| EP | 1502080 A1 | 2/2005 |
| WO | 03093768 A1 | 11/2003 |

OTHER PUBLICATIONS

Extended European Search Report for application No. 23204335.6 dated Apr. 26, 2024, pp. 1-12.

(Continued)

*Primary Examiner* — David H Chu
(74) *Attorney, Agent, or Firm* — Moore IP Law

(57) ABSTRACT

A device includes one or more processors configured to determine a first label location of a first label that identifies a first map location. The one or more processors are further configured to determine, based on the first label location of the first label, a first bounding box of the first label. The one or more processors are also configured to, based on determining that the first bounding box overlaps a second bounding box of a second label, determine a candidate label location of the first label based on an intersection of the first bounding box and the second bounding box. The one or more processors are further configured to, based on determining that the candidate label location satisfies a selection criterion, generate a map including the first label at the candidate label location.

20 Claims, 12 Drawing Sheets

(56) References Cited

U.S. PATENT DOCUMENTS

| | | | |
|---|---|---|---|
| 2012/0120104 A1* | 5/2012 | Kuhne | G09B 29/006 |
| | | | 345/629 |
| 2012/0154430 A1* | 6/2012 | Matsushima | G06F 3/0488 |
| | | | 345/619 |
| 2018/0052594 A1* | 2/2018 | Bemel-Benrud | G06F 3/0482 |
| 2018/0260986 A1* | 9/2018 | Girsova | G06T 11/206 |
| 2019/0362526 A1 | 11/2019 | Loer et al. | |
| 2021/0142527 A1* | 5/2021 | Gyurdiev | G09B 29/003 |
| 2022/0082404 A1* | 3/2022 | Barre | G01C 21/3863 |
| 2022/0207800 A1* | 6/2022 | Pozdnyakov | G09B 29/003 |
| 2023/0083428 A1* | 3/2023 | Natori | G06T 11/60 |
| | | | 345/636 |
| 2024/0185556 A1* | 6/2024 | Kruelle | G06V 10/443 |

OTHER PUBLICATIONS

Qgis Project: "QGIS User Guide—Release 3.4", Part I, Mar. 15, 2020, pp. 1-631, retrieved from internet Mar. 4, 2024.

\* cited by examiner

MAP LABEL LOCATION ADJUSTMENT

FIELD OF THE DISCLOSURE

The present disclosure is generally related to adjusting locations of labels of a map.

BACKGROUND

Maps typically have labels to identify locations. In some cases, a map is automatically rendered with labels that are at pre-determined positions relative to corresponding map locations. For example, a first label identifying a first map location is at a first label location, and a second label identifying a second map location is at a second label location. If the first label is overlaid on the second label, the second label is difficult to read. Maps that are easier to read aid in making more reliable navigation decisions.

SUMMARY

In a particular implementation, a device includes one or more processors configured to determine a first label location of a first label that identifies a first map location. The one or more processors are also configured to determine a first label location of a second label that identifies a second map location. The one or more processors are further configured to determine, based on the first label location of the first label, a first bounding box of the first label. The one or more processors are also configured to determine, based on the first label location of the second label, a first bounding box of the second label. The one or more processors are further configured to determine whether the first bounding box of the first label overlaps the first bounding box of the second label. The one or more processors are also configured to, based on determining that the first bounding box of the first label overlaps the first bounding box of the second label, determine a first candidate label location of the first label and a first candidate label location of the second label based on an intersection of the first bounding box of the first label and the first bounding box of the second label. The one or more processors are further configured to, based on determining that the first candidate label location of the first label satisfies a first selection criterion and that the first candidate label location of the second label satisfies a second selection criterion, generate a map including the first label at the first candidate label location of the first label and the second label at the first candidate label location of the second label.

In another particular implementation, a method includes determining, at a device, a first label location of a first label that identifies a first map location. The method also includes determining, at the device, a first label location of a second label that identifies a second map location. The method further includes determining, based on the first label location of the first label, a first bounding box of the first label. The method also includes determining, based on the first label location of the second label, a first bounding box of the second label. The method further includes determining, at the device, whether the first bounding box of the first label overlaps the first bounding box of the second label. The method also includes, based on determining that the first bounding box of the first label overlaps the first bounding box of the second label, determining a first candidate label location of the first label and a first candidate label location of the second label based on an intersection of the first bounding box of the first label and the first bounding box of the second label. The method further includes, based on determining that the first candidate label location of the first label satisfies a first selection criterion and that the first candidate label location of the second label satisfies a second selection criterion, generating a map including the first label at the first candidate label location of the first label and the second label at the first candidate label location of the second label.

In another particular implementation, a non-transitory computer-readable medium stores instructions that, when executed by one or more processors, cause the one or more processors to determine a first label location of a first label that identifies a first map location. The instructions, when executed by the one or more processors, also cause the one or more processors to determine a first label location of a second label that identifies a second map location. The instructions, when executed by the one or more processors, further cause the one or more processors to determine, based on the first label location of the first label, a first bounding box of the first label. The instructions, when executed by the one or more processors, also cause the one or more processors to determine, based on the first label location of the second label, a first bounding box of the second label. The instructions, when executed by the one or more processors, further cause the one or more processors to determine whether the first bounding box of the first label overlaps the first bounding box of the second label. The instructions, when executed by the one or more processors, also cause the one or more processors to, based on determining that the first bounding box of the first label overlaps the first bounding box of the second label, determine a first candidate label location of the first label and a first candidate label location of the second label based on an intersection of the first bounding box of the first label and the first bounding box of the second label. The instructions, when executed by the one or more processors, further cause the one or more processors to, based on determining that the first candidate label location of the first label satisfies a first selection criterion and that the first candidate label location of the second label satisfies a second selection criterion, generate a map including the first label at the first candidate label location of the first label and the second label at the first candidate label location of the second label.

The features, functions, and advantages described herein can be achieved independently in various implementations or may be combined in yet other implementations, further details of which can be found with reference to the following description and drawings.

DETAILED DESCRIPTION

Figure 1:
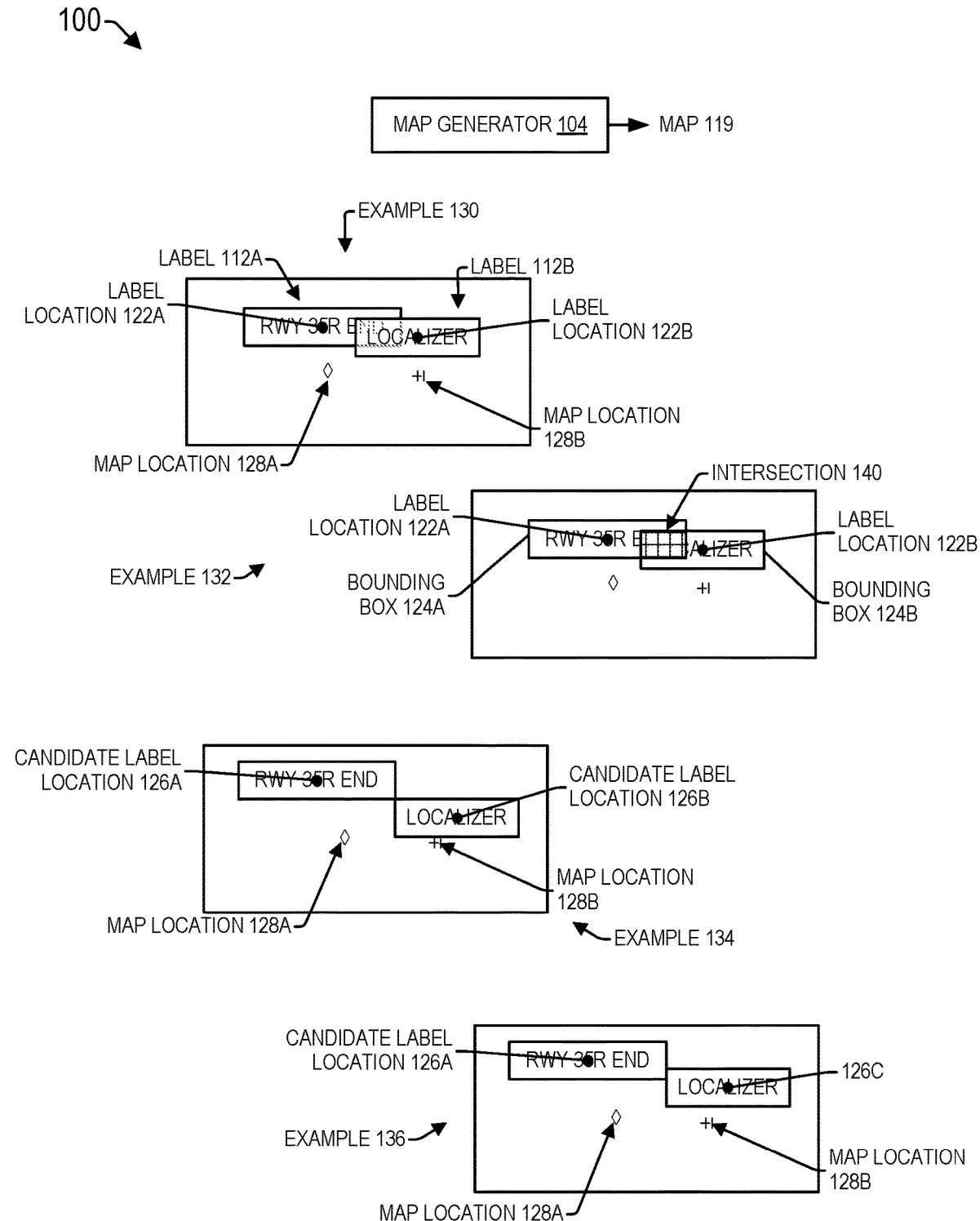
FIG. 1 is a diagram that illustrates examples of operations performed by a map generator that is configured to adjust locations of map labels.

Aspects disclosed herein present systems and methods for adjusting locations of map labels. In some cases, a map is automatically rendered with labels that are at pre-determined positions relative to corresponding map locations. For example, a first label identifying a first map location is at a first label location. The first label location corresponds to a particular position (e.g., a pre-determined distance, a pre-determined direction, or both) relative to the first map location. Similarly, a second label identifying a second map location is at a second label location. If the first label is overlaid on the second label, the second label is difficult to read.

A map generator, prior to generating the map, determines whether any conflicts are detected corresponding to overlapping labels. The map generator, in response to detecting a conflict between any pair of labels, performs deconfliction by determining an adjusted label location for at least one of the pair of labels. The map thus having fewer conflicting labels (e.g., none) is easier to read and aids in more reliable navigation. Resolving the conflicts prior to generating (e.g., rendering) the map is faster and uses fewer computing resources than moving labels in a rendered map. In some cases, the conflicts can be resolved prior to a time-critical rendering and use of the map.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple labels are illustrated and associated with reference numbers 112A and 112B. When referring to a particular one of these labels, such as the label 112A, the distinguishing letter "A" is used. However, when referring to any arbitrary one of these labels or to these labels as a group, the reference number 112 is used without a distinguishing letter.

Figure 2:
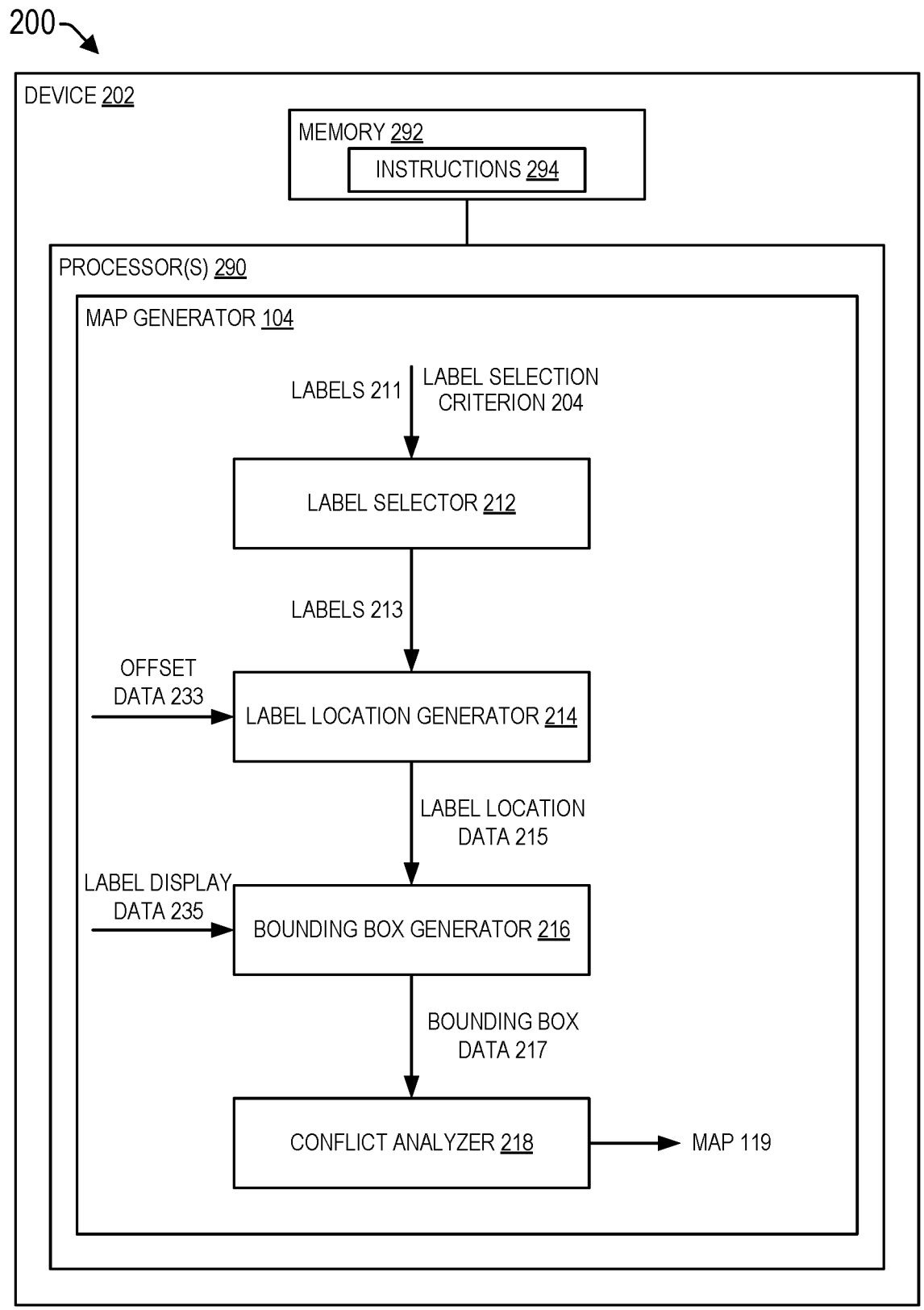
FIG. 2 is a diagram of a system that includes the map generator of FIG. 1.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 2 depicts a device 202 including one or more processors ("processor(s)" 290 in FIG. 2), which indicates that in some implementations the device 202 includes a single processor 290 and in other implementations the device 202 includes multiple processors 290. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts a diagram 100 of an example 130, an example 132, an example 134, and an example 136 of operations performed by a map generator 104 that is configured to adjust locations of map labels.

The map generator 104 determines that a plurality of labels 112, such as a label 112A and a label 112B, are to be displayed in a map, as further described with reference to FIGS. 2 and 3. Each of the plurality of labels 112 identifies a corresponding map location 128. For example, a label 112 includes text, a symbol, a graphic, etc. identifying a map location 128. The map generator 104 determines, based on offset data, label locations 122 of the plurality of labels 112, as further described with reference to FIGS. 2 and 4. In the example 130, the label 112A identifying a map location 128A has a label location 122A, and the label 112B identifying a map location 128B has a label location 122B. In a particular aspect, the map location 128A is indicated using a first map location symbol (e.g., ◊), and the map location 128B is indicated using a second map location symbol (e.g., +|).

The map generator 104 obtains label display data indicating how various types of labels 112 are to be displayed. For example, the label display data can indicate a font size, a font type, a buffer around the text, etc. The map generator 104, based on the label display data, a zoom level, label locations 122, or a combination thereof, determines bounding boxes 124 of the plurality of labels 112, as further described with reference to FIGS. 2 and 5. The map generator 104 determines whether any of the bounding boxes 124 overlap. In the example 132, the map generator 104 determines a bounding box 124A of the label 112A and determines a bounding box 124B of the label 112B. The map generator 104, based on detecting an intersection 140 of the bounding box 124A and the bounding box 124B, determines that the bounding box 124A overlaps the bounding box 124B, as further described with reference to FIGS. 2, 6A, and 6B.

The map generator 104, in response to determining that a pair of bounding boxes 124 overlap, determines a candidate label location for at least one of the pair of bounding boxes 124 based on the intersection 140, as further described with reference to FIGS. 2, 6A, and 6C. In the example 134, the map generator 104, in response to determining that the bounding box 124A overlaps the bounding box 124B, determines a candidate label location 126A of the label 112A and a candidate label location 126B of the label 112B. The candidate label location 126A and the candidate label location 126B are based on the intersection 140. In some implementations, the map generator 104 determines whether label locations satisfy a selection criterion, as further described with reference to FIGS. 2, 6A, and 6D. In the example 134, the map generator 104 determines that the candidate label location 126A satisfies a first selection criterion, and that the candidate label location 126B fails to satisfy a second selection criterion.

In some examples, the selection criterion indicates that a label location (e.g., a label location 122 or a candidate label location 126) of a label 112 is to be within a threshold distance of a map location 128 identified by the label 112. In some examples, the selection criterion indicates that the label location is to be selected such that a corresponding bounding box does not overlap a map location symbol of the map location 128. In the example 134, the map generator 104, in response to determining that a bounding box of the label 112B at the candidate label location 126B overlaps a map location symbol of the map location 128B, determines that the candidate label location 126B fails to satisfy a selection criterion.

In the example 136, the map generator 104, in response to determining that the candidate label location 126B fails to satisfy the selection criterion, determines a candidate label location 126C of the label 112B that satisfies the selection criterion such that a bounding box of the label 112B at the candidate label location 126C does not overlap with a bounding box of the label 112A at the candidate label location 126A, as further described with reference to FIGS. 2, 6A, and 6D.

In some implementations, the map generator 104 generates (e.g., renders) a map 119 with the label 112A at the candidate label location 126A and the label 112B at the candidate label location 126C. In some implementations, the map generator 104 generates map data indicating that the label 112A and the label 112B are to be rendered at the candidate label location 126A and the candidate label location 126C, respectively. In these implementations, another component or device may generate the map 119 based on the map data.

A technical advantage of the map 119 including the label 112A at the candidate label location 126A and the label 112B at the candidate label location 126C can include the map 119 being easier to read than a map that includes the label 112A at the label location 122A and the label 112B at the label location 122B. A technical advantage of resolving the conflicts prior to generating (e.g., rendering) the map 119 can include using less time and fewer computing resources as compared to moving labels in a rendered map. In some cases, a map is rendered in real-time as the map is being used. If a map is used for navigation of a vehicle in a rapidly changing landscape, adjusting labels after the map is rendered can take so long that the information on the map becomes obsolete for navigation as the vehicle has moved on to a different location. With conflicts resolved prior to rendering, the map 119 can be rendered with resolved conflicts faster and aid navigation in time-critical situations.

FIG. 2 depicts an example of a system 200 that includes the map generator 104. In a particular aspect, the system 200 includes a device 202 that includes one or more processors 290 coupled to a memory 292.

The memory 292 includes a computer-readable medium that stores instructions 294 that are executable by the one or more processors 290. The instructions 294 are executable to initiate, perform or control operations to aid in adjusting locations of labels of a map. The one or more processors 290 include the map generator 104 that can be implemented at least in part by the one or more processors 290 executing the instructions 294.

The one or more processors 290 can be implemented as a single processor or as multiple processors, such as in a multi-core configuration, a multi-processor configuration, a distributed computing configuration, a cloud computing configuration, or any combination thereof. In some implementations, one or more portions of the map generator 104 are implemented by the one or more processors 290 using dedicated hardware, firmware, or a combination thereof.

The map generator 104 includes a label selector 212 coupled, via a label location generator 214 and a bounding box generator 216, to a conflict analyzer 218. The label selector 212 is configured to select labels 213 from labels 211 based on a label selection criterion 204, as further described with reference to FIG. 3. The label location generator 214 is configured to determine label location data 215 of the labels 213 based on offset data 233, as further described with reference to FIG. 4. The label location data 215 indicates label locations 122 of the labels 213.

The bounding box generator 216 is configured to generate bounding box data 217 of the labels 213 based on label display data 235, a zoom level, the label location data 215, or a combination thereof, as further described with reference to FIG. 5. The bounding box data 217 indicates dimensions and locations of bounding boxes 124 of the labels 213. The conflict analyzer 218 is configured to perform deconfliction in response to detecting any conflicts among the labels 213 to generate the map 119, as further described with reference to FIGS. 6A-6D.

During operation, the device 202 activates the map generator 104 to generate a map 119. In a particular aspect, the map generator 104 is activated responsive to the device 202 receiving a user input, a command from another device, or both. The label selector 212 selects labels 213 from labels 211 that satisfy a label selection criterion 204, as further described with reference to FIG. 3. The labels 213 are to be included in the map 119. In some examples, the label selection criterion 204 is indicated by a user input, a command, a configuration setting, default data, or a combination thereof.

The label location generator 214 generates label location data 215 of the labels 213 based on offset data 233, as further described with reference to FIG. 4. In an example, the offset data 233 indicates where labels 213 of a particular label type are to be displayed relative to corresponding map locations 128. In some implementations, different label types (e.g., labels associated with different types of information) are associated with different offset data 233. In a particular aspect, the offset data 233 is based on a user input, a configuration setting, default data, or a combination thereof.

The bounding box generator 216 generates bounding box data 217 of the labels 213 based on label display data 235, the label location data 215, a zoom level, or a combination thereof, as further described with reference to FIG. 5. In an example, the label display data 235 indicates that labels 213 of a particular label type are to be displayed with a font type, a font size, etc. The bounding box generator 216 determines the bounding box data 217 indicating dimensions (e.g., width and height) of a bounding box 124 of a label 112 of the labels 213 based at least in part on the label display data 235 associated with a label type of the label 112.

The conflict analyzer 218 performs deconfliction in response to detecting any conflicts among the labels 213 to generate the map 119, as further described with reference to FIGS. 6A-6D. For example, the conflict analyzer 218, based on determining that a first bounding box 124 of a label 112A of the labels 213 overlaps a second bounding box 124 of a label 112B of the labels 213, detects a conflict between the label 112A and the label 112B. The conflict analyzer 218, based on an intersection between the first bounding box 124 and the second bounding box 124, determines a candidate label location of the label 112A, a candidate label location of the label 112B, or both. The conflict analyzer 218 designates, for each of the labels 213, a corresponding label location indicated by the label location data 215 or a corresponding candidate label location determined by the conflict analyzer 218 to resolve a conflict.

In some implementations, the conflict analyzer 218, based on determining that a conflict between the label 112A and the label 112B is not resolvable within a threshold count of deconfliction attempts, that a designated label location of at least one of the label 112A or the label 112B fails to satisfy a selection criterion, or both, generates a notification indicating the conflict, the failure to satisfy the selection criterion, or both. In a particular aspect, the conflict analyzer 218 displays the notification, generates (e.g., renders) the map 119 including the notification, sends the notification to another device, or a combination thereof.

In some aspects, the map generator 104, in response to receiving a user input indicating a particular label location of a label 112, updates a designated label location of the label 112 to indicate the particular label location. For example, a user can override a label location automatically designated by the map generator 104. In a particular aspect, the map generator 104 generates (e.g., renders) the map 119 including the labels 213 at the designated label locations. In a particular implementation, the map generator 104 generates map data indicating that the labels 213 are to be displayed (e.g., rendered) at the designated label locations, and another device (or component) generates the map 119 based on the map data.

A technical advantage of the system 200 resolving the conflicts prior to generating (e.g., rendering) the map 119 can include using less time and fewer computing resources as compared to moving labels in a rendered map. In some cases, a map is rendered in real-time as the map is being used. If a map is used for navigation of a vehicle in a rapidly changing landscape, adjusting labels after the map is rendered can take so long that the information on the map becomes obsolete for navigation as the vehicle has moved on to a different location. With conflicts resolved prior to rendering, the map 119 can be rendered with resolved conflicts faster and aid navigation in time-critical situations.

Although the label selector 212, the label location generator 214, the bounding box generator 216, and the conflict analyzer 218 are depicted as separate components, in other implementations the described functionality of two or more of the label selector 212, the label location generator 214, the bounding box generator 216, and the conflict analyzer 218 can be performed by a single component. In some implementations, each of the label selector 212, the label location generator 214, the bounding box generator 216, the conflict analyzer 218, and the map generator 104 can be represented in hardware, such as via an application-specific integrated circuit (ASIC) or a field-programmable gate array (FPGA), or the operations described with reference to the elements may be performed by a processor executing computer-readable instructions.

Figure 3:
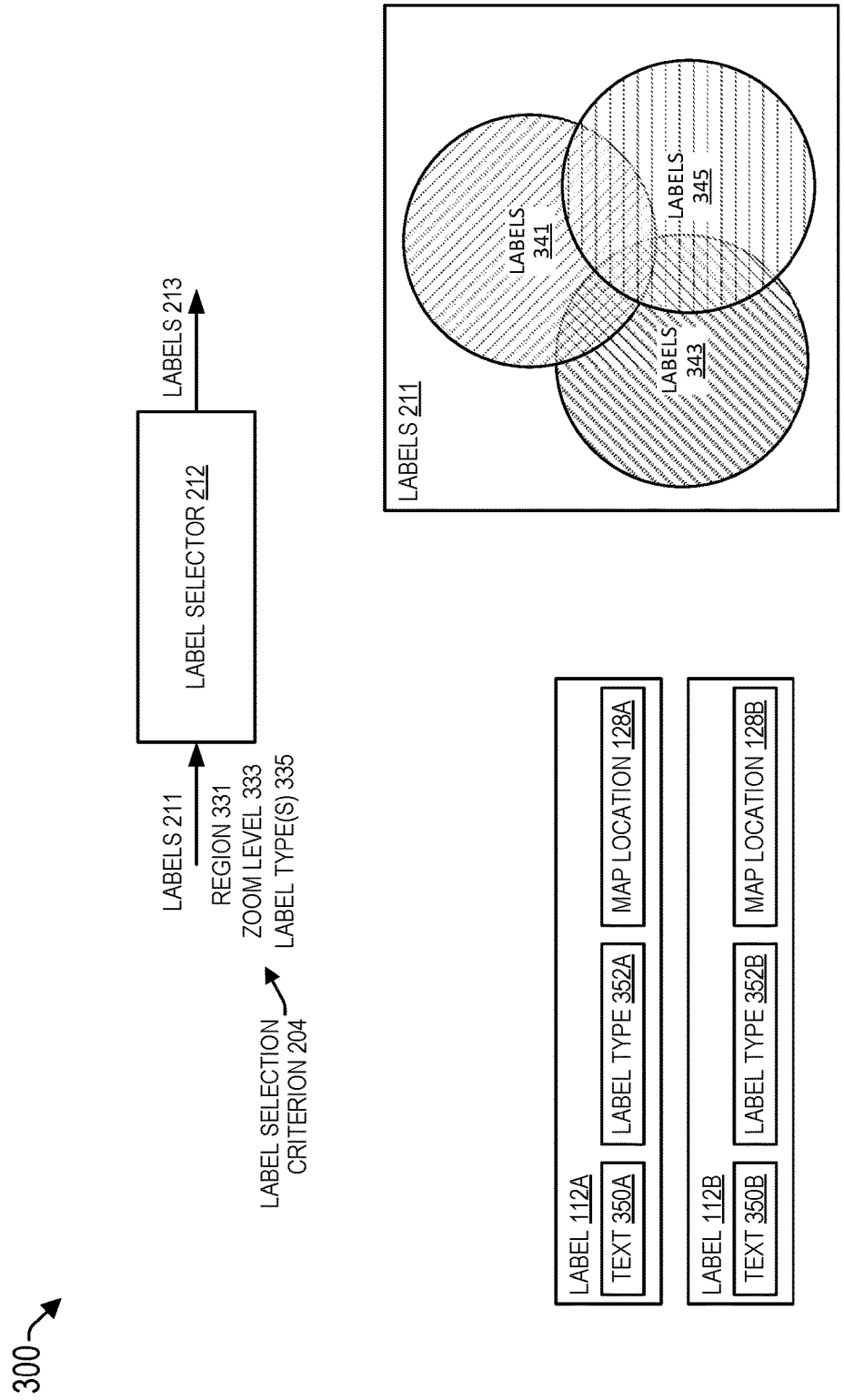
FIG. 3 is a diagram that illustrates examples of operations performed by a label selector of the map generator of FIG. 1.

Referring to FIG. 3, a diagram 300 is shown of examples of operations performed by the label selector 212. The label selector 212 has access to labels 211. For example, the labels 211 include a label 112A, a label 112B, one or more additional labels, or a combination thereof.

The label 112A identifies a map location 128A. For example, the label 112A includes text 350A that identifies the map location 128A. The label 112A including the text 350A identifying the map location 128A is provided as an illustrative example. In other examples, the label 112A can include the text 350A, an image, a graphic, another type of identifier, or a combination thereof, that identifies the map location 128A. In a particular aspect, the label 112A includes a label type 352A indicating that the label 112A identifies a particular type of map location. For example, the label type 352A can include a navigation aid (navaid) label type, a way point label type, a route label type, an airport label type, an airway label type, an airspace label type, or another label type.

Similarly, the label 112B includes text 350B, an image, a graphic, another type of identifier, or a combination thereof, that identifies the map location 128B. In a particular aspect, the label 112B includes a label type 352B indicating that the label 112B identifies a particular type of map location.

In a particular aspect, the label selector 212 selects a subset of the labels 211 that is to be included in the map 119. To illustrate, the label selector 212 selects, based on a label selection criterion 204, labels 213 from labels 211. For example, the label selector 212, in response to determining that the label 112A satisfies the label selection criterion 204, includes the label 112A in the labels 213. In a particular example, the label selector 212, in response to determining that one or more additional labels of the labels 211 satisfy the label selection criterion 204, includes the one or more additional labels in the labels 213.

In a particular aspect, the label selection criterion 204 indicates a region criterion corresponding to a region 331 (e.g., a geographical region), a zoom criterion corresponding to a zoom level 333, a label type criterion corresponding to one or more label types 335, or a combination thereof. For example, the label selection criterion 204 indicates that the map 119 (to be generated) is of the region 331. A first set of map locations 128 are included in the region 331. In a particular aspect, the label selector 212 filters the labels 211 based on the first set of map locations 128. For example, the label selector 212, in response to determining that labels 341 of the labels 211 identify the first set of map locations 128 of the region 331, determines that the labels 341 satisfy the region criterion indicated by the label selection criterion 204.

In some examples, the label selection criterion 204 indicates that the map 119 (to be generated) is to correspond to the zoom level 333. Labels of one or more label types are to be displayed at the zoom level 333. For example, at a first zoom level, labels (e.g., airway labels) corresponding to airways between cities are to be displayed. At a second zoom level, labels (e.g., airport labels) corresponding to runways at an airport are to be displayed. In a particular aspect, the label selector 212 filters the labels 211 based on the one or more label types. For example, the label selector 212, in response to determining that labels 343 of the labels 211 are of the one or more label types associated with the zoom level 333, determines that the labels 343 satisfy the zoom criterion indicated by the label selection criterion 204.

In some examples, the label selection criterion 204 indicates that the map 119 (to be generated) is to include labels of the one or more label types 335. In a particular aspect, the label selector 212 filters the labels 211 based on the one or more label types 335. For example, the label selector 212, in response to determining that labels 345 of the labels 211 are of the one or more label types 335 indicated by the label selection criterion 204, determines that the labels 345 satisfy the label type criterion indicated by the label selection criterion 204.

In a particular aspect, the label selection criterion 204 indicates a single one of the region criterion, the zoom criterion, or the label type criterion, and the label selector 212 selects the labels (e.g., the labels 341, the labels 343, or the labels 345) that satisfy the single one of the region criterion, the zoom criterion, or the label type criterion as the labels 213.

In a particular aspect, the label selection criterion 204 indicates multiple of the region criterion, the zoom criterion, or the label type criterion, and the label selector 212 selects an intersection of corresponding labels as the labels 213. For example, the label selector 212, in response to determining that the label selection criterion 204 indicates the region criterion, the zoom criterion, and the label type criterion, selects an intersection of the labels 341, the labels 343, and the labels 345 as the labels 213.

In a particular aspect, the label selection criterion 204 indicates multiple of the region criterion, the zoom criterion, or the label type criterion, and the label selector 212 selects a combination of corresponding labels as the labels 213. For example, the label selector 212, in response to determining that the label selection criterion 204 indicates the region criterion, the zoom criterion, and the label type criterion, selects a combination of the labels 341, the labels 343, and the labels 345 as the labels 213. In some aspects, a configurations setting, a user input, default data, or a combination thereof, indicates whether an intersection or a combination of labels are to be selected.

Figure 4:
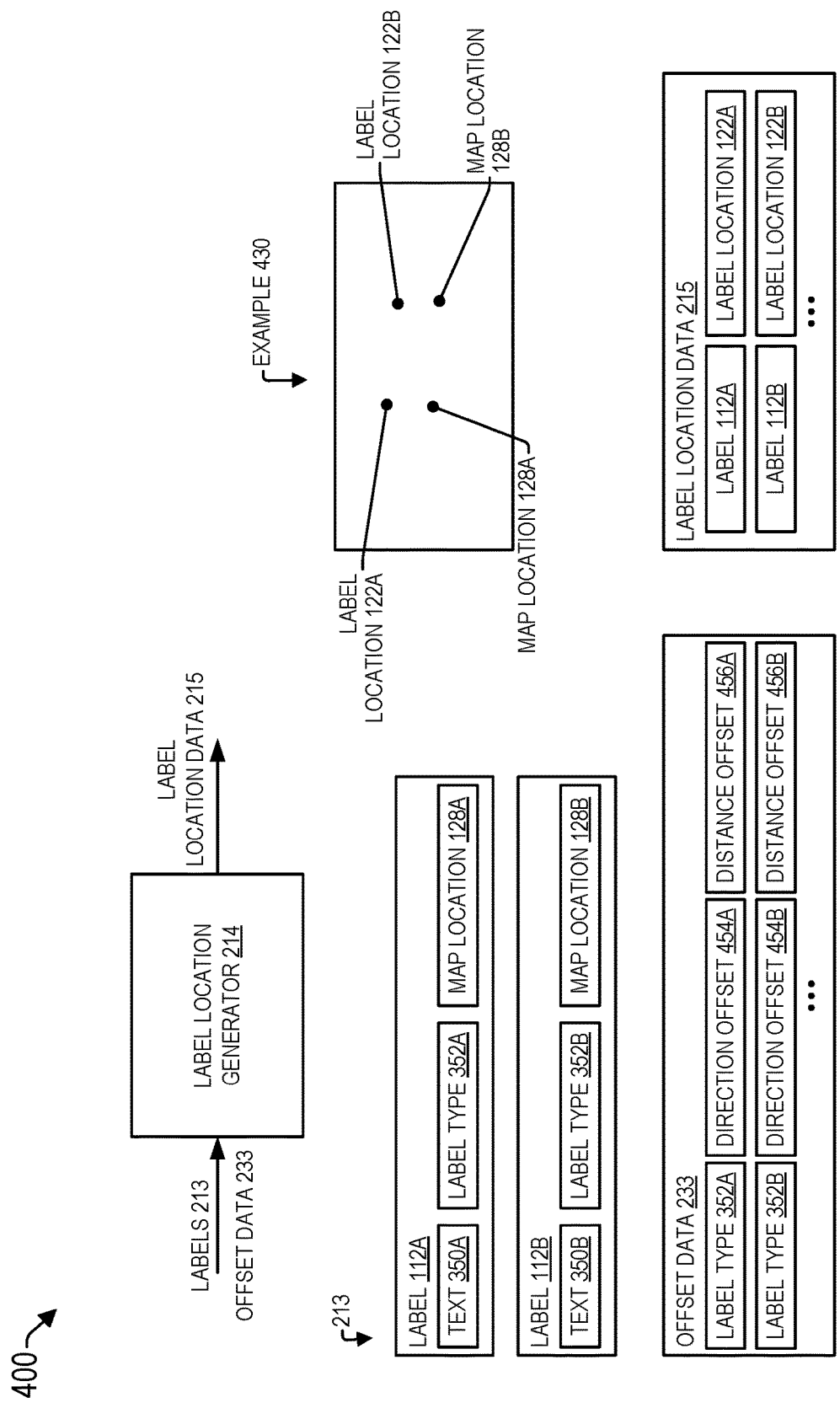
FIG. 4 is a diagram that illustrates examples of operations performed by a label location generator of the map generator of FIG. 1.

Referring to FIG. 4, a diagram 400 is shown of examples of operations performed by the label location generator 214. The label location generator 214 is configured to generate, based on the offset data 233, label location data 215 indicating label locations 122 of the labels 213.

In a particular aspect, the offset data 233 indicates a direction offset 454, a distance offset 456, or both, associated with a label type 352. For example, the offset data 233 indicates that a direction offset 454A, a distance offset 456A, or both, are associated with a label type 352A. As another example, the offset data 233 indicates that a direction offset 454B, a distance offset 456B, or both, are associated with a label type 352B. The offset data 233 including offsets for two label types is provided as an illustrative example. In other examples, the offset data 233 can indicate offsets for a single label type or for more than two label types.

The label location generator 214 determines label locations 122 of the labels 213 based on the map locations 128 and the offsets indicated by the offset data 233. In an example 430, the label location generator 214, in response to determining that the labels 213 include a label 112A identifying a map location 128A that is of a label type 352A and that the offset data 233 indicates that the label type 352A is associated with the direction offset 454A, the distance offset 456A, or both, determines a label location 122A based on applying the direction offset 454A, the distance offset 456A, or both, to the map location 128A. In an example, the direction offset 454A (e.g., a value greater than or equal to 0 degrees and less than 360 degrees) indicates a direction of the label location 122A relative to the map location 128A. In another example, the distance offset 456A indicates a distance of the label location 122A from the map location 128A. To illustrate, the distance offset 456A indicates a Cartesian distance between coordinates of the label location 122A and coordinates of the map location 128A.

Similarly, the label location generator 214, in response to determining that the labels 213 include a label 112B identifying a map location 128B that is of a label type 352B and that the offset data 233 indicates that the label type 352B is associated with the direction offset 454B, the distance offset 456B, or both, determines a label location 122B based on applying the direction offset 454B, the distance offset 456B, or both, to the map location 128B.

The label location generator 214 generates the label location data 215 indicating that the label 112A has the label location 122A, the label 112B has the label location 122B, one or more additional labels of the labels 213 have corresponding label locations, or a combination thereof. In a particular aspect, the label locations 122 correspond to default locations of the labels 213 in the map 119 (to be generated).

Figure 5:
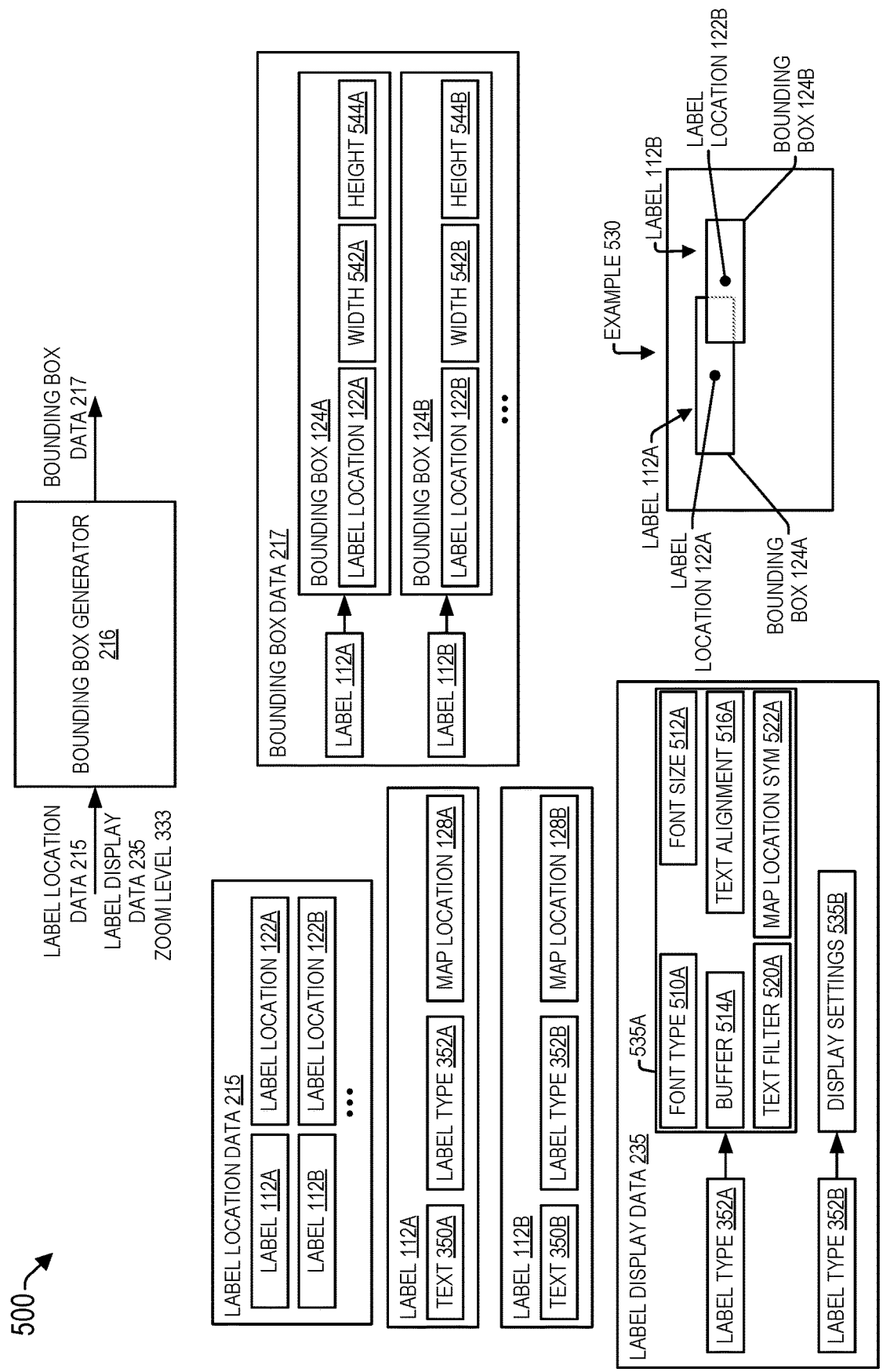
FIG. 5 is a diagram that illustrates examples of operations performed by a bounding box generator of the map generator of FIG. 1.

Referring to FIG. 5, a diagram 500 illustrates examples of operations performed by the bounding box generator 216. The bounding box generator 216 is configured to generate, based on the label location data 215, the zoom level 333, the label display data 235, or a combination thereof, bounding box data 217 indicating bounding boxes 124 of the labels 213.

The label display data 235 indicates display settings 535 associated with the label types 352. For example, the label display data 235 indicates display settings 535A of the label type 352A, display settings 535B of the label type 352B, display settings of one or more additional label types or a combination thereof. To illustrate, the display settings 535A indicates that a label of the label type 352A is to be displayed with a font type 510A, a font size 512A, a buffer 514A, a text alignment 516A, a text filter 520A, a map location symbol 522A, or a combination thereof. In a particular implementation, the label display data 235 includes display settings associated with various zoom levels. For example, the display settings 535A are associated with the zoom level 333 and indicate how labels of the label type 352A are to be displayed for the zoom level 333.

In a particular aspect, the label 112A is of the label type 352A. The bounding box generator 216, based on the display settings 535A, determines that the buffer 514A indicates space to be included around text (or another type of identifier) to be displayed for the label 112A. In some implementations, the buffer 514A includes a top buffer, a bottom buffer, a left side buffer, a right side buffer, or a combination thereof. The text alignment 516A (e.g., a value greater than or equal to 0 and less than 360, a value indicating horizontal or vertical alignment, etc.) indicates an alignment of the text (or another type of identifier) to be displayed for the label 112A. The text filter 520A indicates how the text 350A is to be processed to generate the text to be displayed for the label 112A. For example, the text filter 520A can indicate that a word included in the text 350A (e.g., "runway") is to be substituted with one or more characters (e.g., "RWY").

The bounding box generator 216, based on the display settings 535A and the text 350A, determines dimensions (e.g., a width 542A, a height 544A, or both) of a bounding box 124A of the label 112A. Similarly, the bounding box generator 216, based on the display settings 535B and the text 350B, determines dimensions (e.g., a width 542B, a height 544B, or both) of a bounding box 124B of the label 112B. In some aspects, the display settings 535A can have one or more settings in common with the display settings 535B. In some aspects, the display settings 535A can have one or more settings that are distinct from the display settings 535B.

The bounding box generator 216 determines, based on the label location 122A, the bounding box 124A of the label 112A. For example, the label location 122A has coordinates including a horizontal coordinate ($X_L$) and a vertical coordinate ($Y_L$). A top-left vertex of the bounding box 124A has a horizontal coordinate ($X_{TL}$) that is based on the horizontal coordinate ($X_L$) of the label location 122A and the width 542A (e.g., $X_{TL}=X_L-0.5$ (width 542A)). The top-left vertex of the bounding box 124A has a vertical coordinate ($Y_{TL}$) that is based on the vertical coordinate ($Y_L$) of the label location 122A and the height 544A (e.g., $Y_{TL}=Y_L+0.5$ (height 544A)).

A bottom-right vertex of the bounding box 124A has a horizontal coordinate ($X_{BR}$) that is based on the horizontal coordinate ($X_L$) of the label location 122A and the width 542A (e.g., $X_{BR}=X_L+0.5$ (width 542A)). The bottom-right vertex of the bounding box 124A has a vertical coordinate ($Y_{BR}$) that is based on the vertical coordinate ($Y_L$) of the label location 122A and the height 544A (e.g., $Y_{BR}=Y_L-0.5$ (height 544A)). Similarly, the bounding box generator 216 determines, based on the label location 122B, the bounding box 124B of the label 112B.

The bounding box generator 216 generates the bounding box data 217 indicating that the label 112A has the bounding box 124A, the label 112B has the bounding box 124B, one or more additional labels of the labels 213 have corresponding bounding boxes 124, or a combination thereof. In an example 530, the bounding box generator 216 generates the bounding box data 217 indicating that the label 112A has the bounding box 124A at the label location 122A and that the label 112B has the bounding box 124B at the label location 122B.

Figure 6A:
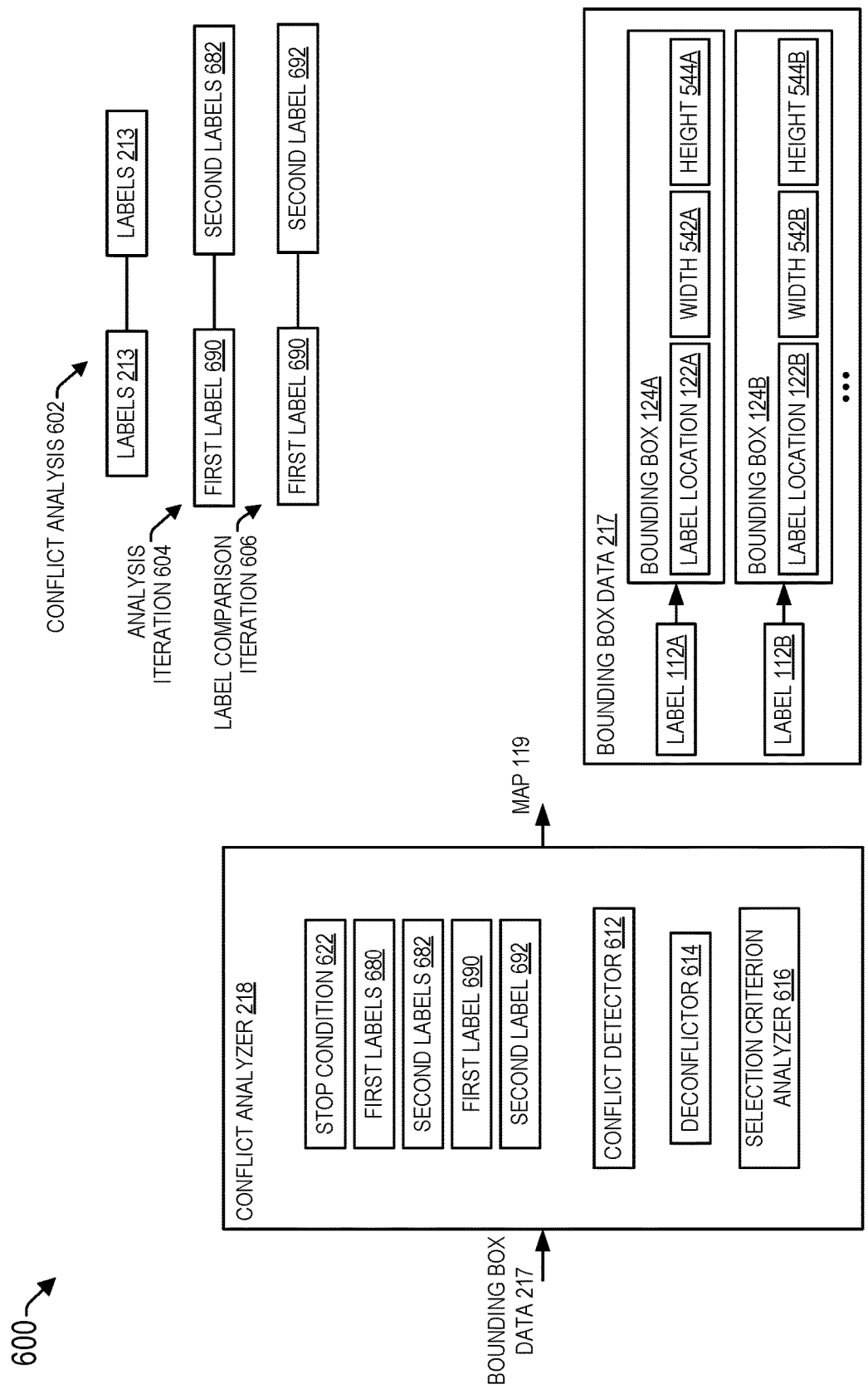
FIG. 6A is a diagram that illustrates examples of operations performed by a conflict analyzer of the map generator of FIG. 1.

Referring to FIG. 6A, a diagram 600 illustrates examples of operations performed by the conflict analyzer 218. The conflict analyzer 218 includes the conflict detector 612 coupled via a deconflictor 614 to a selection criterion analyzer 616.

The conflict detector 612 is configured to determine, based on the bounding box data 217, whether a conflict exists between at least a pair of the labels 213, as further described with reference to FIG. 6B. The deconflictor 614 is configured to generate candidate label locations of the pair of the labels 213 to resolve the conflict, as further described with reference to FIG. 6C. The selection criterion analyzer 616 is configured to determine whether a candidate label location satisfies a selection criterion, as further described with reference to FIG. 6D.

In a particular implementation, the conflict analyzer 218, in response to receiving the bounding box data 217 from the bounding box generator 216, performs a conflict analysis 602 until a stop condition 622 is detected. In a particular aspect, the stop condition 622 includes detecting that a threshold count of iterations have been performed, detecting that a timer has expired, determining that no conflicts are detected between any pair of the labels 213, or a combination thereof.

In a particular aspect, the conflict analysis 602 corresponds to a comparison of each of the labels 213 with others of the labels 213 to determine whether a conflict is detected. In a particular implementation, the conflict analyzer 218 initializes first labels 680 to include the labels 213. The first labels 680 correspond to labels that are remaining for the conflict analysis 602. The conflict analyzer 218 performs one or more analysis iterations 604 during the conflict analysis 602 to compare each of the labels 213 to others of the labels 213.

The conflict analyzer 218, in response to determining that the first labels 680 include at least one label, determines that an analysis iteration 604 is to be performed. During an analysis iteration 604, the conflict analyzer 218 performs a conflict analysis of one of the first labels 680. As an example, the conflict analyzer 218 removes a particular label 112 (e.g., the label 112A) from the first labels 680, and designates the particular label 112 as a first label 690. The first label 690 corresponds to a label that is being analyzed during the analysis iteration 604. The conflict analyzer 218 initializes second labels 682 with all labels from the labels 213 other than the first label 690. The second labels 682 correspond to labels that are to be compared with the first label 690 during the analysis iteration 604.

The conflict analyzer 218 performs one or more label comparison iterations 606 during the analysis iteration 604 to compare the first label 690 to the second labels 682. During a label comparison iteration 606, the conflict analyzer 218 performs a comparison of the first label 690 with one of the second labels 682. As an example, the conflict analyzer 218 removes a particular label 112 (e.g., the label 112B) from the second labels 682, and designates the particular label 112 as a second label 692. The first label 690 is compared to the second label 692 during the label comparison iteration 606. The conflict analyzer 218 provides the first label 690 and the second label 692 to the conflict detector 612.

The conflict detector 612 performs a comparison of the first label 690 and the second label 692 based on the bounding box data 217, as further described with reference to FIG. 6B. The conflict analyzer 218, in response to determining that the conflict detector 612 indicates no conflict between the first label 690 and the second label 692, determines that the label comparison iteration 606 has ended successfully. Alternatively, the conflict analyzer 218, in response to determining that the conflict detector 612 indicates a conflict between the first label 690 and the second label 692, provides the bounding boxes of the first label 690 and the second label 692 to the deconflictor 614.

The deconflictor 614 determines candidate label locations of the first label 690 and the second label 692 based on bounding boxes of the first label 690 and the second label 692, as further described with reference to FIG. 6C. In a particular example, the first label 690 includes the label 112A and the second label 692 includes the label 112B. In this example, the deconflictor 614 determines the candidate label location 126A and the candidate label location 126B based on the bounding box 124A of the label 112A and the bounding box 124B of the label 112B.

The conflict analyzer 218 provides candidate label locations (e.g., the candidate label location 126A and the candidate label location 126B) to the selection criterion analyzer 616. The selection criterion analyzer 616 determines whether each of the candidate label locations satisfies a corresponding selection criterion, as further described with reference to FIG. 6D.

The conflict analyzer 218, in response to determining that each of the candidate label locations (e.g., the candidate label location 126A and the candidate label location 126B) satisfies a corresponding selection criterion, determines that a label location of at least one of the first label 690 or the second label 692 is to be updated. For example, the conflict analyzer 218, in response to determining that the label location 122A is distinct from the candidate label location 126A, updates the bounding box data 217 to set the label location 122A of the bounding box 124A to indicate the candidate label location 126A, and resets the second labels 682 to include all of the labels 213 other than the first label 690 (e.g., the label 112A). To illustrate, since the first label 690 (e.g., the label 112A) has moved, the second labels 682 are reset so that subsequent label comparison iterations 606 also include any of the labels 213 to which the label 112A has already been compared. As another example, the conflict analyzer 218, in response to determining that the label location 122B is distinct from the candidate label location 126B, updates the bounding box data 217 to set the label location 122B to indicate the candidate label location 126B and, if the label 112B is not included in the first labels 680, adds the label 112B to the first labels 680. To illustrate, since the label 112B has moved, if an analysis iteration 604 of the label 112B has already been performed, the label 112B is added back to the first labels 680 so that an analysis iteration 604 of the label 112B can be performed again. The conflict analyzer 218, in response to determining that each of the candidate label locations (e.g., the candidate label location 126A and the candidate label location 126B) satisfies a corresponding selection criterion, determines that the label comparison iteration 606 has ended.

In some implementations, the conflict analyzer 218, in response to determining that at least one of the candidate label locations (e.g., the candidate label location 126A and the candidate label location 126B) fails to satisfy a corresponding selection criterion, uses the deconflictor 614, the selection criterion analyzer 616, or both, to process the first label 690 and the second label 692 again. For example, the conflict analyzer 218 provides the bounding boxes of the first label 690 and the second label 692 to the deconflictor 614. In some examples, the conflict analyzer 218 provides the candidate label locations of the first label 690 and the second label 692 to the deconflictor 614.

In a particular aspect, the deconflictor 614 generates an output indicating that all available candidate label locations for the first label 690, the second label 692, or both, have been previously generated during the label comparison iteration 606. The conflict analyzer 218, in response to receiving the output from the deconflictor 614, determines that the label comparison iteration 606 has ended unsuccessfully. Alternatively, the deconflictor 614 generates an updated version of the candidate label locations, as further described with reference to FIG. 6C, and the conflict analyzer 218 provides the updated candidate label locations to the selection criterion analyzer 616. The label comparison iteration 606 continues with the selection criterion analyzer 616 determining whether each of the updated candidate label locations satisfies the corresponding selection criterion.

In some implementations, the conflict analyzer 218, in response to determining that one (e.g., the candidate label location 126A) of the candidate label locations satisfies a corresponding selection criterion and that the other (e.g., the candidate label location 126B) of the candidate label locations fails to satisfy the second selection criterion, generates an updated version of the candidate label location 126B based on the candidate label location 126A and the candidate label location 126B, and provides the updated version of the candidate label location 126B to the selection criterion analyzer 616. In these implementations, the conflict analyzer 218 refrains from generating an updated version of the candidate label location 126A in response to determining that the candidate label location 126A satisfies the first selection criterion. The label comparison iteration 606 continues with the selection criterion analyzer 616 determining whether the updated candidate label location satisfies the corresponding selection criterion.

In some implementations, the conflict analyzer 218, in response to determining that the label comparison iteration 606 has ended unsuccessfully, refrains from updating the label locations of the first label 690 (e.g., the label 112A) and the second label 692 (e.g., the label 112B). In these implementations, the conflict analyzer 218 generates a notification indicating a conflict between the label 112A at the label location 122A and the label 112B at the label location 122B.

In some implementations, the conflict analyzer 218, in response to determining that the label comparison iteration 606 has ended unsuccessfully, sets the label locations of the first label 690 and the second label 692 to the candidate label locations, and generates a notification indicating that a corresponding selection criterion is not satisfied. For example, the conflict analyzer 218, in response to determining that the candidate label location 126A is distinct from the label location 122A, updates the bounding box data 217 to set the label location 122A of the bounding box 124A to indicate the candidate label location 126A and resets the second labels 682 to include all of the labels 213 other than the first label 690 (e.g., the label 112A). Similarly, the conflict analyzer 218, in response to determining that the candidate label location 126B is distinct from the label location 122B, updates the bounding box data 217 to set the label location 122B to indicate the candidate label location 126B and, if the label 112B is not included in the first labels 680, adds the label 112B to the first labels 680.

The conflict analyzer 218 generates a notification indicating that the label 112B at the candidate label location 126B fails to satisfy the second selection criterion. In a particular aspect, the conflict analyzer 218 adds the notification (e.g., of a detected conflict or failure to satisfy a selection criterion) to the bounding box data 217. The conflict analyzer 218, when generating the map 119 (or map data), includes the notification in the map 119, the map data, an alert, or a combination thereof.

In some implementations, the conflict analyzer 218, in response to determining that the label comparison iteration 606 has ended, determines whether the stop condition 622 is detected. In some examples, the conflict analyzer 218, in response to determining that at least a threshold count of label comparison iterations 606 have been performed, a timer has expired, or both, determines that the stop condition 622 is detected. The conflict analyzer 218, in response to determining that the stop condition 622 is detected, determines that the conflict analysis 602 has ended and generates (e.g., renders) the map 119, the map data, an alert, or a combination thereof, based on the bounding box data 217. In a particular aspect, the conflict analyzer 218 provides the map 119, the map data, the alert, or a combination thereof, to another component or device.

In a particular example, the map 119 is generated based on the label display data 235. For example, the map generator 104 generates the map 119 to display the label 112A based on the font type 510A, the font size 512A, the buffer 514A, the text alignment 516A, the text filter 520A, or a combination thereof. As another example, the map generator 104 generates the map 119 to display the map location symbol 522A at the map location 128A.

In a particular aspect, the conflict analyzer 218, in response to determining that the label comparison iteration 606 has ended and that the stop condition 622 is not detected, determines whether another label comparison iteration 606 is to be performed with the first label 690. For example, the conflict analyzer 218, in response to determining that the second labels 682 include at least one label to be compared to the first label 690, initiates another label comparison iteration 606. To illustrate, the conflict analyzer 218 removes a particular label 112 from the second labels 682 and designates the particular label 112 as the second label 692. The conflict analyzer 218 provides the first label 690 and the second label 692 to the conflict detector 612. Alternatively, the conflict analyzer 218, in response to determining that there are no labels in the second labels 682, determines that the analysis iteration 604 has ended.

In some implementations, the conflict analyzer 218, in response to determining that the analysis iteration 604 has ended, determines whether the stop condition 622 is detected. In some examples, the conflict analyzer 218, in response to determining that at least a threshold count of analysis iterations 604 have been performed, a timer has expired, or both, determines that the stop condition 622 is detected. The conflict analyzer 218, in response to determining that the stop condition 622 is detected, determines that the conflict analysis 602 has ended and generates (e.g., renders) the map 119, the map data, an alert, or a combination thereof, based on the bounding box data 217. In a particular aspect, the conflict analyzer 218 provides the map 119, the map data, the alert, or a combination thereof, to another component or device.

In a particular aspect, the conflict analyzer 218, in response to determining that the analysis iteration 604 has ended and that the stop condition 622 is not detected, determines whether another analysis iteration 604 is to be performed with another label selected as the first label 690. For example, the conflict analyzer 218, in response to determining that the first labels 680 include at least one label to be analyzed, initiates another analysis iteration 604. To illustrate, the conflict analyzer 218 removes a particular label 112 (e.g., the label 112B) from the first labels 680 and designates the particular label 112 as the first label 690. The conflict analyzer 218 initializes the second labels 682 with all labels from the labels 213 other than the first label 690. The conflict analyzer 218 performs one or more label comparison iterations 606 to compare the first label 690 to the second labels 682.

The conflict analyzer 218, in response to determining that there are no labels in the first labels 680, determines that the conflict analysis 602 has ended and generates the map 119, map data, an alert, or a combination thereof, based on the bounding box data 217. For example, the map 119 includes the label 112A at the label location 122A indicated by the bounding box data 217, the label 112B at the label location 122B indicated by the bounding box data 217, one or more additional labels 112 at label locations 122 indicated by the bounding box data 217, one or more notifications, or a combination thereof. In some examples, the label location 122A indicated by the bounding box data 217 corresponds to the label location 122A generated by the label location generator 214. For example, the label location 122A has not been updated by the conflict analyzer 218. In some examples, the label location 122A indicated by the bounding box data 217 corresponds to the candidate label location 126A generated by the deconflictor 614. For example, the label location 122A has been updated by the conflict analyzer 218 to resolve a conflict.

In a particular aspect, the conflict analyzer 218 provides the map 119, the map data, an alert (e.g., including a notification), or a combination thereof, to another component or device (e.g., a display device, a user device, a network device, etc.).

A technical advantage of the conflict analyzer 218 resolving the conflicts prior to generating (e.g., rendering) the map 119 can include using less time and fewer computing resources as compared to moving labels in a rendered map. With conflicts resolved prior to rendering, the map 119 can be rendered with resolved conflicts faster and aid navigation in time-critical situations.

Figure 6B:
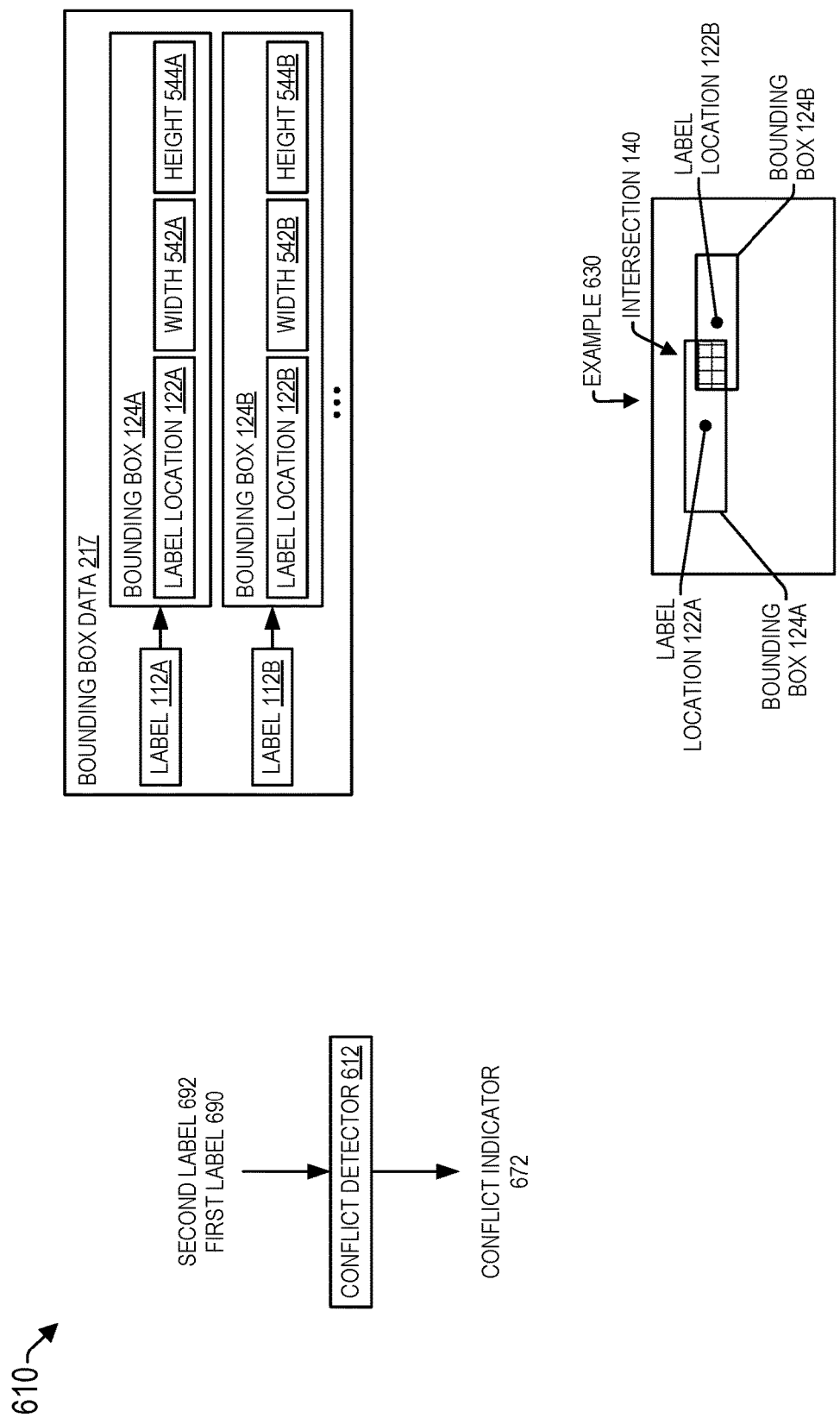
FIG. 6B is a diagram that illustrates examples of operations performed by a conflict detector of the conflict analyzer of FIG. 6A.

Referring to FIG. 6B, a diagram 610 illustrates examples of operations performed by the conflict detector 612. The conflict detector 612 is configured to generate a conflict indicator 672 indicating whether a conflict is detected between the first label 690 and the second label 692.

The conflict detector 612 performs a comparison of the first label 690 and the second label 692 based on the bounding box data 217. In an example, the first label 690 is the label 112A and the second label 692 is the label 112B. In this example, the conflict detector 612 determines whether the bounding box 124A of the label 112A overlaps the bounding box 124B of the label 112B. In a particular aspect, the conflict detector 612 determines that the bounding box 124A overlaps the bounding box 124B in response to determining that at least one vertex of the bounding box 124A is within the bounding box 124B, at least one vertex of the bounding box 124B is within the bounding box 124A, or both. In a particular aspect, the conflict detector 612 determines that the bounding box 124A overlaps the bounding box 124B in response to determining that the label location 122A is the same as the label location 122B and that the bounding box 124A has the same dimensions as the bounding box 124B (e.g., the width 542A is the same as the width 542B and the height 544A is the same as the height 544B).

The conflict detector 612 determines whether a particular vertex is within a bounding box based on comparing vertex coordinates of the bounding box with coordinates of the particular vertex. For example, the conflict detector 612 determines coordinates ($X_{TL}$, $Y_{TL}$) of the top-left vertex of the bounding box 124A based on coordinates ($X_L$, $Y_L$) of the label location 122A, the width 542A, and the height 544A, as described with reference to FIG. 5. The conflict detector 612 determines coordinates ($X_{BR}$, $Y_{BR}$) of the bottom-right vertex of the bounding box 124A based on coordinates ($X_L$, $Y_L$) of the label location 122A, the width 542A, and the height 544A, as described with reference to FIG. 5. The conflict detector 612 determines that a vertex (X, Y) of the bounding box 124B is within the bounding box 124A based on determining that X is greater than $X_{TL}$ and less than $X_{BR}$ and Y is greater than $Y_{BR}$ and less than $Y_{TL}$. In an example 630, a top-left vertex of the bounding box 124B is within the bounding box 124A and a bottom-right vertex of the bounding box 124A is within the bounding box 124B.

The conflict detector 612, in response to determining that the bounding box 124A overlaps the bounding box 124B, generates the conflict indicator 672 having a first value (e.g., 1) indicating a conflict between the first label 690 and the second label 692. Alternatively, the conflict detector 612, in response to determining that the bounding box 124A does not overlap the bounding box 124B, generates the conflict indicator 672 having a second value (e.g., 0) indicating no conflict between the first label 690 and the second label 692.

Figure 6C:
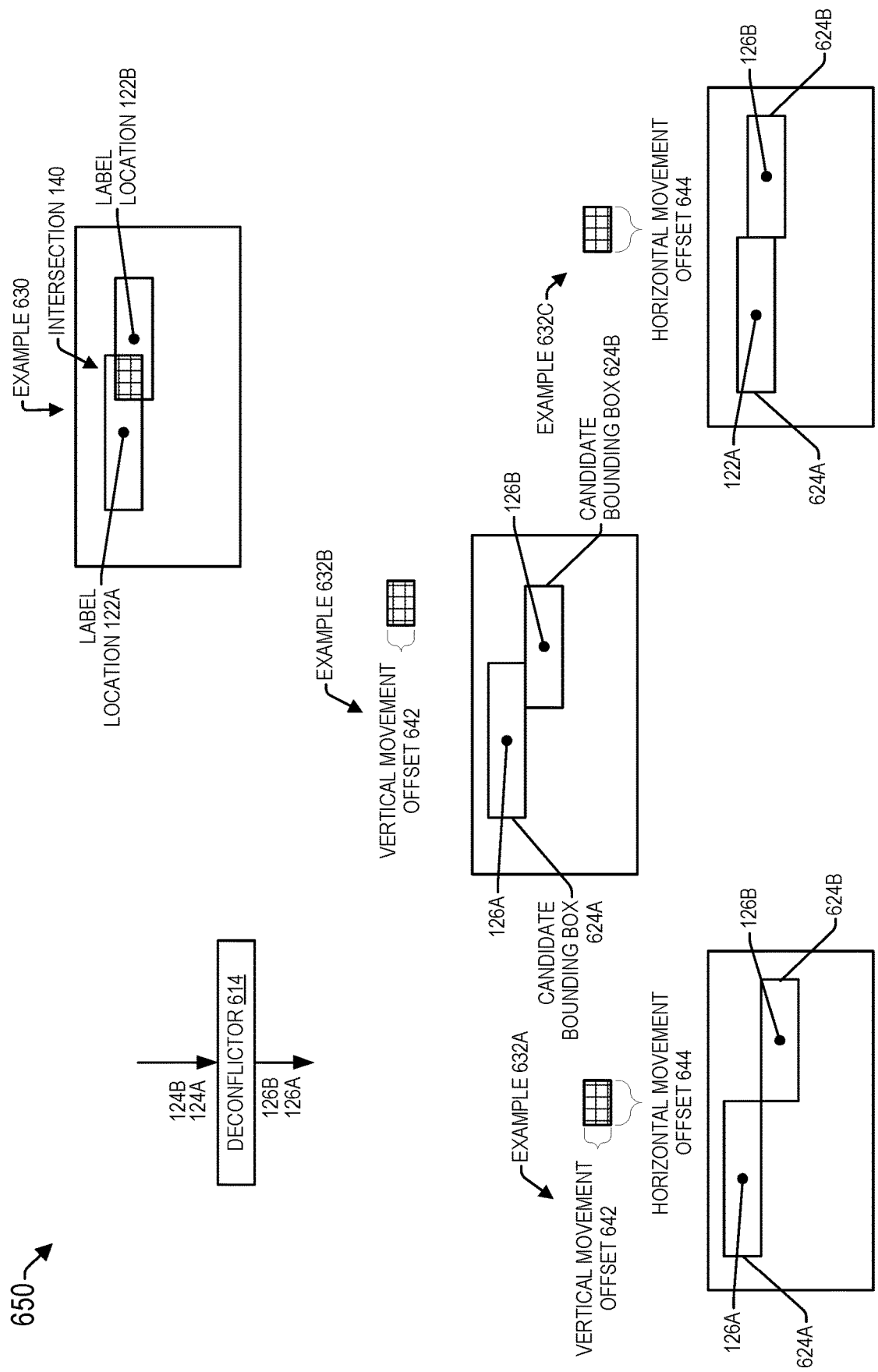
FIG. 6C is a diagram that illustrates examples of operations performed by a deconflictor of the conflict analyzer of FIG. 6A.

Referring to FIG. 6C, a diagram 650 is shown that illustrates examples of operations performed by the deconflictor 614. The deconflictor 614 is configured to generate a pair of candidate label locations 126 to resolve a conflict between a pair of bounding boxes 124.

The deconflictor 614 determines an intersection 140 of the bounding boxes of the first label 690 and the second label 692. In an example in which the first label 690 is the label 112A and the second label 692 is the label 112B, the deconflictor 614 determines the intersection 140 of the bounding box 124A and the bounding box 124B.

The deconflictor 614 determines vertex coordinates of the intersection 140 based on vertex coordinates of the bounding box 124A and the bounding box 124B. In an example, the deconflictor 614 determines the coordinates ($X_{ATL}$, $Y_{ATL}$) of the top-left vertex and the coordinates ($X_{ABR}$, $Y_{ABR}$) of the bottom-right vertex of the bounding box 124A, as described with reference to FIG. 5. Similarly, the deconflictor 614 determines coordinates ($X_{BTL}$, $Y_{BTL}$) of the top-left vertex and coordinates ($X_{BBR}$, $Y_{BBR}$) of the bottom-right vertex of the bounding box 124B.

The deconflictor 614 determines coordinates ($X_{ITL}$, $Y_{ITL}$) of a top-left vertex of the intersection 140 based on the coordinates ($X_{ATL}$, $Y_{ATL}$) of the top-left vertex of the bounding box 124A and the coordinates ($X_{BTL}$, $Y_{BTL}$) of the top-left vertex of the bounding box 124B (e.g., $X_{ITL}$=max ($X_{ATL}$, $X_{BTL}$), where max (a, b) corresponds to the higher of a or b, and $Y_{ITL}$=min ($Y_{ATL}$, $Y_{BTL}$), where min (a, b) corresponds to the lower of a or b).

The deconflictor 614 determines coordinates ($X_{IBR}$, $Y_{IBR}$) of a bottom-right vertex of the intersection 140 based on the coordinates ($X_{ABR}$, $Y_{ABR}$) of the bottom-right vertex of the bounding box 124A and the coordinates ($X_{BBR}$, $Y_{BBR}$) of the bottom-right vertex of the bounding box 124B (e.g., $X_{IBR}$=min ($X_{ABR}$, $X_{BBR}$), and $Y_{IBR}$=max ($Y_{ABR}$, $Y_{BBR}$)). In a particular aspect, the intersection 140 is indicated by the top-left vertex coordinates ($X_{ITL}$, $Y_{ITL}$) and the bottom-right vertex coordinates ($X_{IBR}$, $Y_{IBR}$).

The deconflictor 614 determines a movement offset based on dimensions of the intersection 140 (e.g., as indicated by the coordinates). The movement offset includes a vertical movement offset 642, a horizontal movement offset 644, or both. In some implementations, the deconflictor 614 determines the vertical movement offset 642 based on a difference between a vertical coordinate of the top-left vertex of the intersection 140 and a vertical coordinate of the bottom-right vertex of the intersection 140 (e.g., the vertical movement offset 642=$Y_{ITL}$−$Y_{IBR}$). In some implementations, the deconflictor 614 determines the horizontal movement offset 644 based on a difference between a horizontal coordinate of the bottom-right vertex of the intersection 140 and a horizontal coordinate of the top-left vertex of the intersection 140 (e.g., the horizontal movement offset 644=$X_{IBR}$−$X_{ITL}$).

The deconflictor 614 applies a first portion of the movement offset to the label location 122A to determine a candidate label location 126A of the label 112A, a second portion of the movement offset to the label location 122B to determine a candidate label location 126B of the label 112B, or both. In some implementations, the first portion, the second portion, or both, are based on relative priorities associated with the label type 352A of the label 112A and the label type 352B of the label 112B. For example, the first portion is higher than the second portion if a first priority of the label type 352A is lower than a second priority of the label type 352B.

A candidate bounding box 624A of the label 112A is at the candidate label location 126A and has the same dimensions as the bounding box 124A. A candidate bounding box 624B of the label 112B is at the candidate label location 126B and has the same dimensions as the bounding box 124B. The candidate bounding box 624A does not overlap the candidate bounding box 624B.

In an example 632A, the movement offset includes the vertical movement offset 642 and the horizontal movement offset 644. In an example 632B, the movement offset includes the vertical movement offset 642 and does not include the horizontal movement offset 644. In an example 632C, the movement offset includes the horizontal movement offset 644 and does not include the vertical movement offset 642. In each of the example 632A, the example 632B, and the example 632C, the deconflictor 614 applies half of the movement offset to the label location 122A to determine the candidate label location 126A and half of the movement offset to the label location 122B to determine the candidate label location 126B.

In the example 632A, coordinates ($X_{ACL}$, $Y_{ACL}$) of the candidate label location 126A are based on coordinates ($X_{AL}$, $Y_{AL}$) of the label location 122A, half of the horizontal movement offset 644, and half of the vertical movement offset 642 (e.g., $X_{ACL}$=$X_{AL}$−0.5 (the horizontal movement offset 644), and $Y_{ACL}$=$Y_{AL}$+0.5 (the vertical movement offset 642)). Similarly, coordinates ($X_{BCL}$, $Y_{BCL}$) of the candidate label location 126B are based on coordinates ($X_{BL}$, $Y_{BL}$) of the label location 122B, half of the horizontal movement offset 644, and half of the vertical movement offset 642 (e.g., $X_{BCL}=X_{BL}+0.5$ (the horizontal movement offset 644), and $Y_{BCL}=Y_{BL}-0.5$ (the vertical movement offset 642)).

In the example 632B, coordinates ($X_{ACL}$, $Y_{ACL}$) of the candidate label location 126A are based on coordinates ($X_{AL}$, $Y_{AL}$) of the label location 122A and half of the vertical movement offset 642 (e.g., $X_{ACL}=X_{AL}$ and $Y_{ACL}=Y_{AL}+0.5$ (the vertical movement offset 642)). Similarly, coordinates ($X_{BCL}$, $Y_{BCL}$) of the candidate label location 126B are based on coordinates ($X_{BL}$, $Y_{BL}$) of the label location 122B and half of the vertical movement offset 642 (e.g., $X_{BCL}=X_{BL}$, and $Y_{BCL}=Y_{BL}-0.5$ (the vertical movement offset 642)).

In the example 632C, coordinates ($X_{ACL}$, $Y_{ACL}$) of the candidate label location 126A are based on coordinates ($X_{AL}$, $Y_{AL}$) of the label location 122A and half of the horizontal movement offset 644 (e.g., $X_{ACL}=X_{AL}-0.5$ (the horizontal movement offset 644), and $Y_{ACL}=Y_{AL}$). Similarly, coordinates ($X_{BCL}$, $Y_{BCL}$) of the candidate label location 126B are based on coordinates ($X_{BL}$, $Y_{BL}$) of the label location 122B and half of the horizontal movement offset 644 (e.g., $X_{BCL}=X_{BL}+0.5$ (the horizontal movement offset 644), and $Y_{BCL}=Y_{BL}$).

The example 632A, the example 632B, and the example 632C are provided as illustrative, non-limiting, examples of applying portions of movement offsets to the label location 122A and the label location 122B to determine the candidate label location 126A and the candidate label location 126B, respectively. In other examples, other types of movement offsets can be applied to the label location 122A, the label location 122B, or both.

In some implementations, the deconflictor 614 has a set of available movement offset combinations that can be performed. For example, a first movement offset combination includes a vertical movement offset 642 and a horizontal movement offset 644. A second movement offset combination includes the vertical movement offset 642 and not the horizontal movement offset 644. A third movement offset combination includes the horizontal movement offset 644 and not the vertical movement offset 642. The set of available movement offset combinations can include one or more of the first movement offset combination, the second movement offset combination, the third movement offset combination, or another type of movement offset combination. In a particular aspect, the deconflictor 614 selects one of the available movement offset combinations from the set to generate candidate label locations 126.

In a particular implementation, the deconflictor 614 initializes a set of remaining movement offset combinations to include each of the available movement offset combinations at a start of the label comparison iteration 606 of the first label 690 and the second label 692. The deconflictor 614, in response to receiving a request from the conflict analyzer 218 to generate candidate label locations during the label comparison iteration 606, selects one of the movement offset combinations from the set of remaining offset movement combinations to generate the candidate label locations 126 and removes the selected movement offset combination from the set of remaining offset movement combinations. The deconflictor 614, in response to determining that the set of remaining movement combinations is empty, determines that all available candidate label locations for the first label 690 and the second label 692 have been previously generated.

In a particular implementation, the deconflictor 614 receives previously generated candidate label locations (e.g., the candidate label location 126A and the candidate label location 126B) of the first label 690 and the second label 692 from the conflict analyzer 218 with an indication that least one of the candidate label locations fails to satisfy a corresponding selection criterion. The deconflictor 614 determines the candidate bounding box 624A corresponding to the candidate label location 126A and the candidate bounding box 624B corresponding to the candidate label location 126B. The deconflictor 614 determines updated versions of the candidate label location 126A and the candidate label location 126B based on the candidate bounding box 624A and the candidate bounding box 624B. For example, the deconflictor 614 determines updated versions of the candidate label location 126A and the candidate label location 126B such that there is no conflict between corresponding updated versions of the candidate bounding box 624A and the candidate bounding box 624B.

Figure 6D:
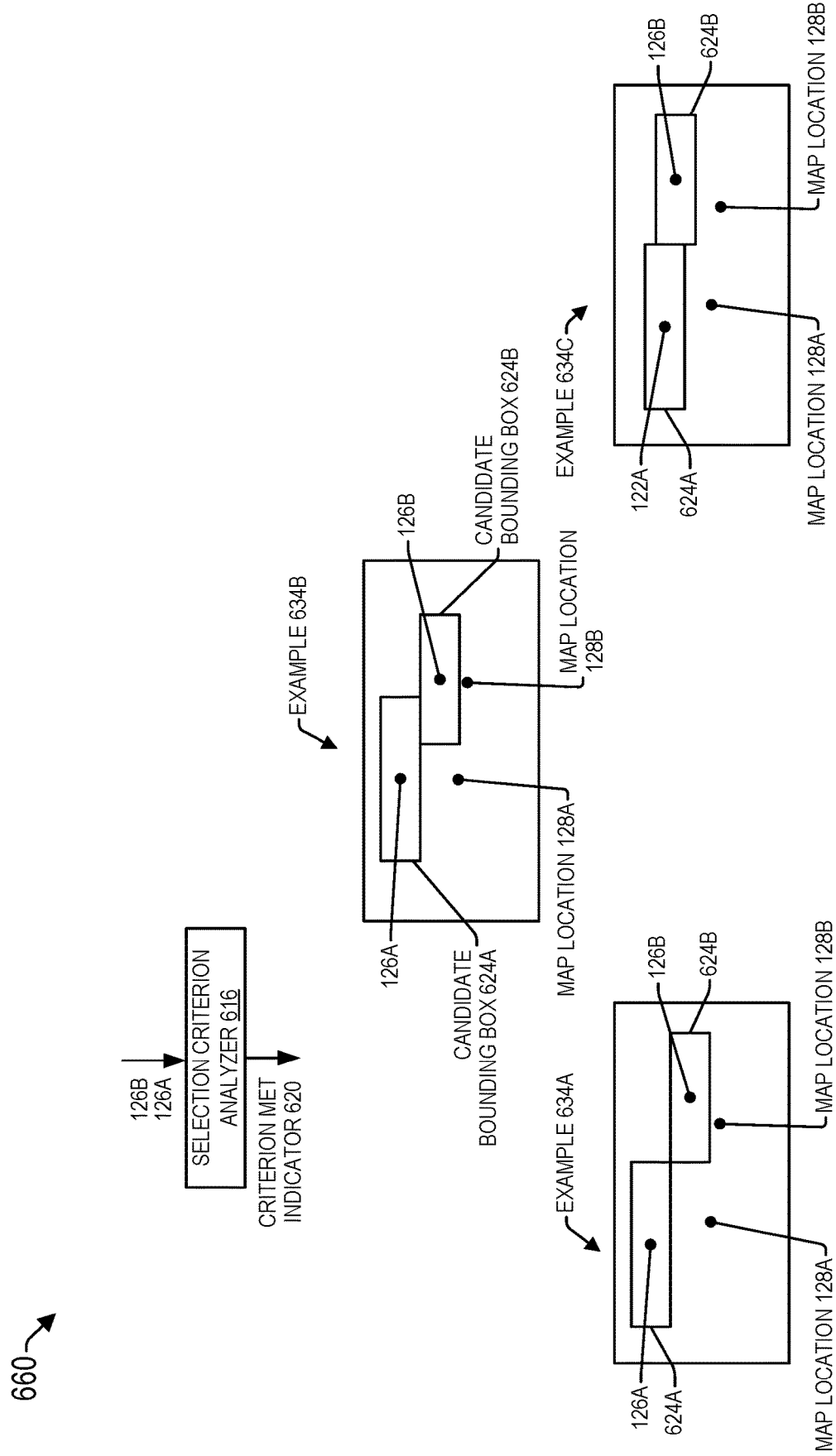
FIG. 6D is a diagram that illustrates examples of operations performed by a selection criterion analyzer of the conflict analyzer of FIG. 6A.

Referring to FIG. 6D, a diagram 660 illustrates examples of operations performed by the selection criterion analyzer 616. The selection criterion analyzer 616 is configured to determine whether the candidate label location 126A satisfies a first selection criterion, the candidate label location 126B satisfies a second selection criterion, or both.

The selection criterion analyzer 616 determines, based on the candidate label location 126A, a candidate bounding box 624A of the label 112A. For example, the candidate bounding box 624A is at the candidate label location 126A and has the same dimensions (e.g., the width 542A, the height 544A, or both) as the bounding box 124A. Similarly, the selection criterion analyzer 616 determines, based on the candidate label location 126B, a candidate bounding box 624B of the label 112B. For example, the candidate bounding box 624B is at the candidate label location 126B and has the same dimensions (e.g., the width 542B, the height 544B, or both) as the bounding box 124B.

In a particular aspect, the selection criterion analyzer 616 determines that the candidate label location 126A satisfies the first selection criterion based at least in part on determining that the candidate label location 126A is greater than or equal to a first threshold distance from the map location 128A (or the map location symbol 522A), less than or equal to a second threshold distance from the map location 128A (or the map location symbol 522A), or both. In a particular aspect, the selection criterion analyzer 616 determines that the candidate label location 126A satisfies the first selection criterion based at least in part on determining that the candidate bounding box 624A is at least a first threshold distance from the map location 128A (or the map location symbol 522A), is within a second threshold distance from the map location 128A (or the map location symbol 522A), or both. One or more of the threshold distances are based on a user input, a configuration setting, default data, the zoom level 333 of FIG. 3, a corresponding label type 352, or a combination thereof.

Similarly, the selection criterion analyzer 616 determines that the candidate label location 126B satisfies the second selection criterion based at least in part on determining that the candidate label location 126B is greater than or equal to a first threshold distance from the map location 128B (or a second map location symbol of the label type 352B), less than or equal to a second threshold distance from the map location 128B (or the second map location symbol), or both. In a particular aspect, the selection criterion analyzer 616 determines that the candidate label location 126B satisfies the second selection criterion based at least in part on determining that the candidate bounding box 624B is at least a first threshold distance from the map location 128B (or the second map location symbol), is within a second threshold distance from the map location 128B (or the second map location symbol), or both.

In some implementations, the selection criterion analyzer 616 determines that the candidate label location 126A of the label 112A satisfies the first selection criterion based at least in part on determining that the candidate bounding box 624A does not overlap bounding boxes (e.g., as indicated by the bounding box data 217) of any of the other labels of the labels 213. Similarly, the selection criterion analyzer 616 determines that the candidate label location 126B of the label 112B satisfies the second selection criterion based at least in part on determining that the candidate bounding box 624B does not overlap bounding boxes (e.g., as indicated by the bounding box data 217) of any of the other labels of the labels 213.

An example 634A corresponds to the candidate label location 126A and the candidate label location 126B of the example 632A of FIG. 6B. An example 634B corresponds to the candidate label location 126A and the candidate label location 126B of the example 632B of FIG. 6B. An example 634C corresponds to the candidate label location 126A and the candidate label location 126B of the example 632C of FIG. 6C.

In each of the example 634A, the example 634B, and the example 634C, the selection criterion analyzer 616, in response to determining that the candidate bounding box 624A is at least a first threshold distance from the map location 128A and less than a second threshold distance from the map location 128A, determines that the candidate label location 126A satisfies the first selection criterion.

In each of the example 634A and the example 634B, the selection criterion analyzer 616, in response to determining that the candidate bounding box 624B is less than a first threshold distance from the map location 128B, determines that the candidate label location 126B fails to satisfy the second selection criterion. In the example 634C, the selection criterion analyzer 616, in response to determining that the candidate bounding box 624B is at least the first threshold distance from the map location 128B and is within a second threshold distance from the map location 128B, determines that the candidate label location 126B satisfies the second selection criterion.

In each of the example 634A, the example 634B, and the example 634C, the selection criterion analyzer 616 generates a criterion met indicator 620 indicating that the candidate label location 126A satisfies a corresponding selection criterion. In the each of the example 634A and the example 634B, the criterion met indicator 620 indicating that the candidate label location 126B fails to satisfy a corresponding selection criterion. In the example 634C, the criterion met indicator 620 indicates that the candidate label location 126B satisfies a corresponding selection criterion.

Figure 7:
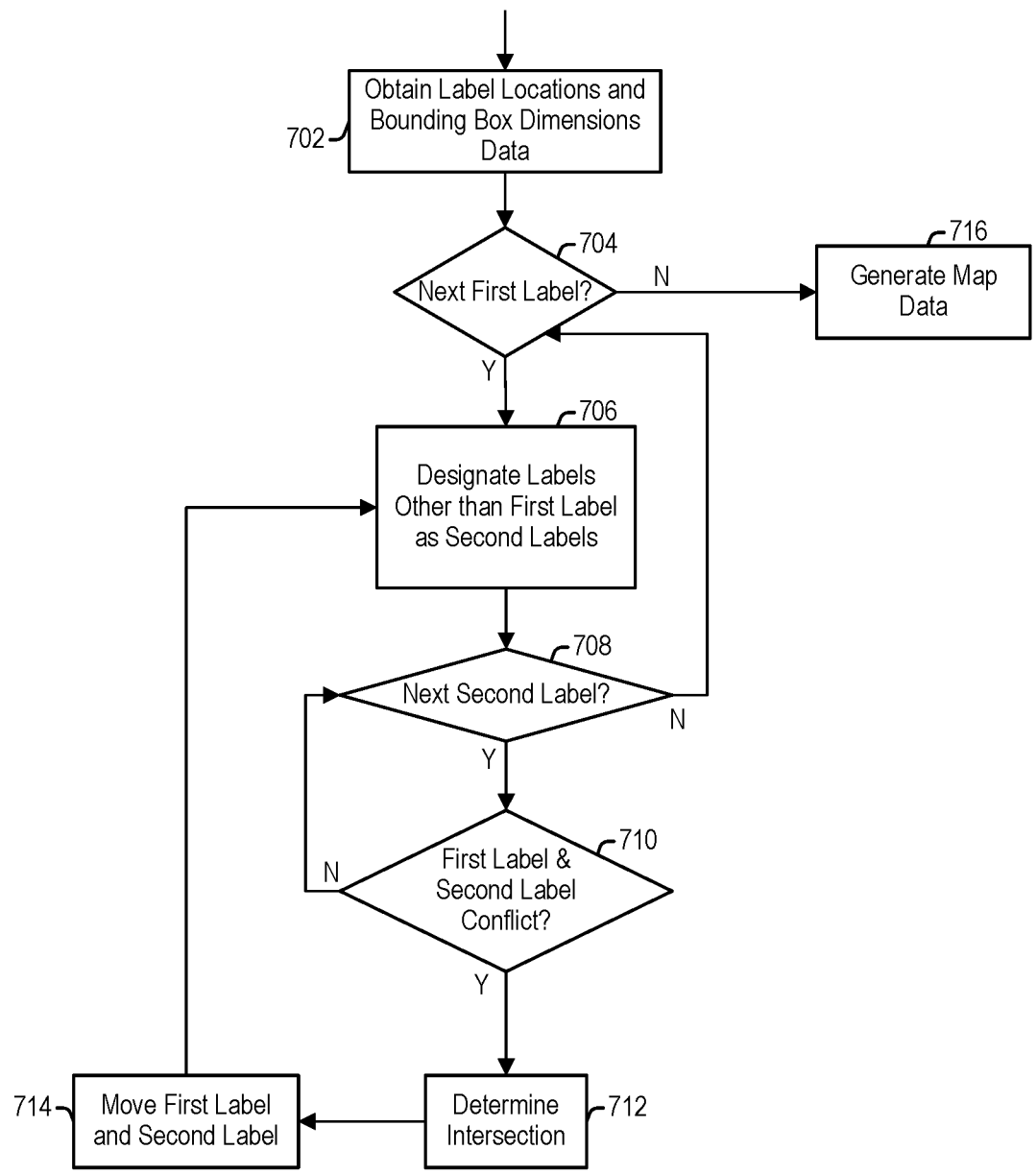
FIG. 7 is a diagram that illustrates a flow chart of an example of a method of adjusting locations of map labels.

Referring to FIG. 7, an example is shown of a method 700 of an example of adjusting locations of map labels. In a particular aspect, one or more operations of the method 700 are performed by the map generator 104 of FIG. 1, the label selector 212, the label location generator 214, the bounding box generator 216, the conflict analyzer 218, the one or more processors 290, the device 202, the system 200 of FIG. 2, or a combination thereof.

For example, at 702, the bounding box generator 216 of FIG. 2 obtains (e.g., generates) the bounding box data 217 indicating label locations and bounding box dimensions, as described with reference to FIGS. 2 and 5.

At 704, the conflict analyzer 218 of FIG. 2 determines whether the first labels 680 include at least one label, as described with reference to FIG. 6A. At 716, the conflict analyzer 218, in response to determining that there are no labels in the first labels 680 and that the bounding box data 217 includes at least one bounding box, generates the map 119, map data, an alert, or a combination thereof, based on the bounding box data 217. Alternatively, the conflict analyzer 218, in response to determining that there are no labels in the first labels 680 and that there are no bounding boxes indicated in the bounding box data 217, generates an output indicating that no map is generated.

The conflict analyzer 218, in response to determining that the first labels 680 include at least one label, initiates an analysis iteration 604, as described with reference to FIG. 6A. For example, at 706, the conflict analyzer 218 designates one of the first labels 680 as the first label 690 and designates all of the labels 213 other than the first label 690 as the second labels 682, as described with reference to FIG. 6A. At 708, the conflict analyzer 218 determines whether the second labels 682 include at least one label, as described with reference to FIG. 6A. The conflict analyzer 218, in response to determining that there are no labels in the second labels 682, determines that the analysis iteration 604 has ended and, at 704, determines whether the first labels 680 include at least one label to initiate a next analysis iteration.

Alternatively, the conflict analyzer 218, in response to determining that the second labels 682 include at least one label, initiates a label comparison iteration 606, as described with reference to FIG. 6A. For example, the conflict analyzer 218 selects one of the second labels 682 as the second label 692, and the conflict detector 612 determines, at 710, whether the first label 690 conflicts with the second label 692, as described with reference to FIG. 6B.

The conflict analyzer 218, in response to determining that no conflict is detected between the first label 690 and the second label 692, determines that the label comparison iteration 606 has ended successfully, as described with reference to FIG. 6A, and, at 708, determines whether the second labels 682 include at least one label to initiate a next label comparison iteration.

Alternatively, at 712, the conflict analyzer 218, in response to determining that the first label 690 conflicts with the second label 692, determines an intersection between the first label 690 and the second label 692. For example, the conflict analyzer 218, in response to determining that the conflict detector 612 detected a conflict between the first label 690 and the second label 692, provides bounding boxes of the first label 690 and the second label 692 to the deconflictor 614, as described with reference to FIG. 6A. The deconflictor 614 determines the intersection 140 between the first label 690 and the second label 692, as described with reference to FIG. 6C.

At 714, the conflict analyzer 218 moves the first label 690, the second label 692, or both. For example, the deconflictor 614 generates candidate label locations of the first label 690 and the second label 692 based on the intersection 140, as described with reference to FIG. 6C. The selection criterion analyzer 616 determines whether each of the candidate label locations satisfies a corresponding selection criterion, as described with reference to FIG. 6D. The conflict analyzer 218 updates the bounding box data 217 to designate a candidate label location as a label location based at least in part on the candidate label location satisfying the selection criterion, as described with reference to FIG. 6A. At 706, the conflict analyzer 218, responsive to moving the first label 690, resets the second labels 682 to include all of the labels 213 other than the first label 690, as described with reference to FIG. 6A.

Figure 8:
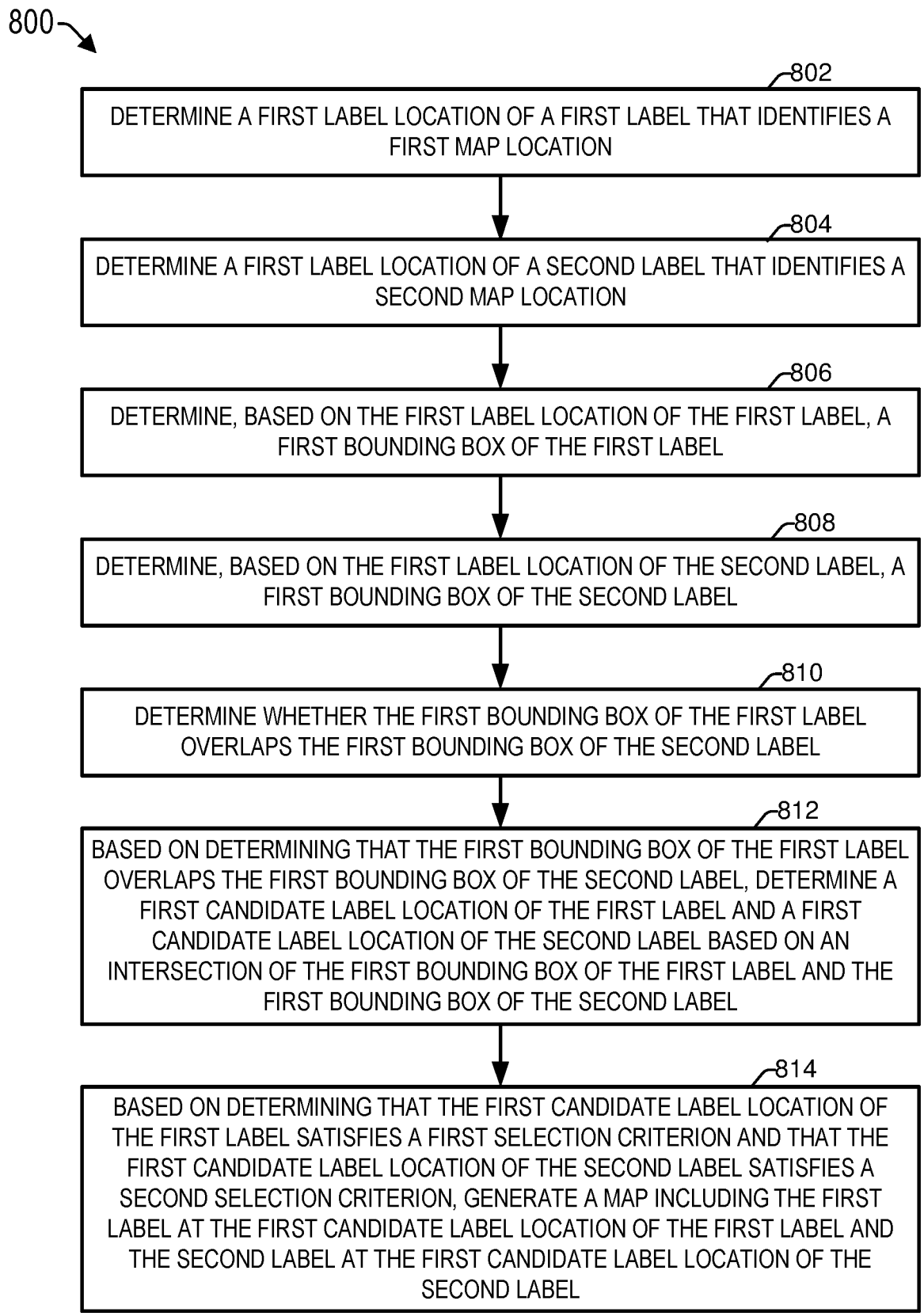
FIG. 8 is a diagram that illustrates a flow chart of another example of a method of adjusting locations of map labels.

Referring to FIG. 8, an example is shown of a method 800 of an example of adjusting locations of map labels. In a particular aspect, one or more operations of the method 800 are performed by the map generator 104 of FIG. 1, the label selector 212, the label location generator 214, the bounding box generator 216, the conflict analyzer 218, the one or more processors 290, the device 202, the system 200 of FIG. 2, or a combination thereof.

The method 800 includes, at 802, determining a first label location of a first label that identifies a first map location. For example, the label location generator 214 of FIG. 2 determines the label location 122A of the label 112A that identifies the map location 128A, as described with reference to FIGS. 2 and 4.

The method 800 also includes, at 804, determining a first label location of a second label that identifies a second map location. For example, the label location generator 214 of FIG. 2 determines the label location 122B of the label 112B that identifies the map location 128B, as described with reference to FIGS. 2 and 4.

The method 800 further includes, at 806, determining, based on the first label location of the first label, a first bounding box of the first label. For example, the bounding box generator 216 of FIG. 2 determines, based on the label location 122A, the bounding box 124A of the label 112A, as described with reference to FIGS. 2 and 5.

The method 800 also includes, at 808, determining, based on the first label location of the second label, a first bounding box of the second label. For example, the bounding box generator 216 of FIG. 2 determines, based on the label location 122/b, the bounding box 124B of the label 112B, as described with reference to FIGS. 2 and 5.

The method 800 further includes, at 810, determining whether the first bounding box of the first label overlaps the first bounding box of the second label. For example, the conflict detector 612 of FIG. 6A determines whether the bounding box 124A overlaps the bounding box 124B, as described with reference to FIGS. 6A and 6B.

The method 800 also includes, at 812, based on determining that the first bounding box of the first label overlaps the first bounding box of the second label, determining a first candidate label location of the first label and a first candidate label location of the second label based on an intersection of the first bounding box of the first label and the first bounding box of the second label. For example, the deconflictor 614 of FIG. 6B, based on determining that the bounding box 124A overlaps the bounding box 124B, determines the candidate label location 126A and the candidate label location 126B based on the intersection 140 of the bounding box 124A and the bounding box 124B, as described with reference to FIGS. 6A and 6C.

The method 800 further includes, at 814, based on determining that the first candidate label location of the first label satisfies a first selection criterion and that the first candidate label location of the second label satisfies a second selection criterion, generating a map including the first label at the first candidate label location of the first label and the second label at the first candidate label location of the second label. For example, the selection criterion analyzer 616 of FIG. 6A determines that the candidate label location 126A satisfies a first criterion and the candidate label location 126B satisfies a second criterion, as described with reference to the example 634C of FIG. 6D. The conflict analyzer 218, in response to determining that each of the candidate label location 126A and the candidate label location 126B satisfies a corresponding selection criterion, generates the map 119 including the label 112A at the candidate label location 126A and the label 112B at the candidate label location 126B, as described with reference to FIG. 6A.

A technical advantage of the method 800 can include that the label 112A at the candidate label location 126A and the label 112B at the candidate label location 126C is easier to read than the label 112A at the label location 122A and the label 112B at the label location 122B.

Figure 9:
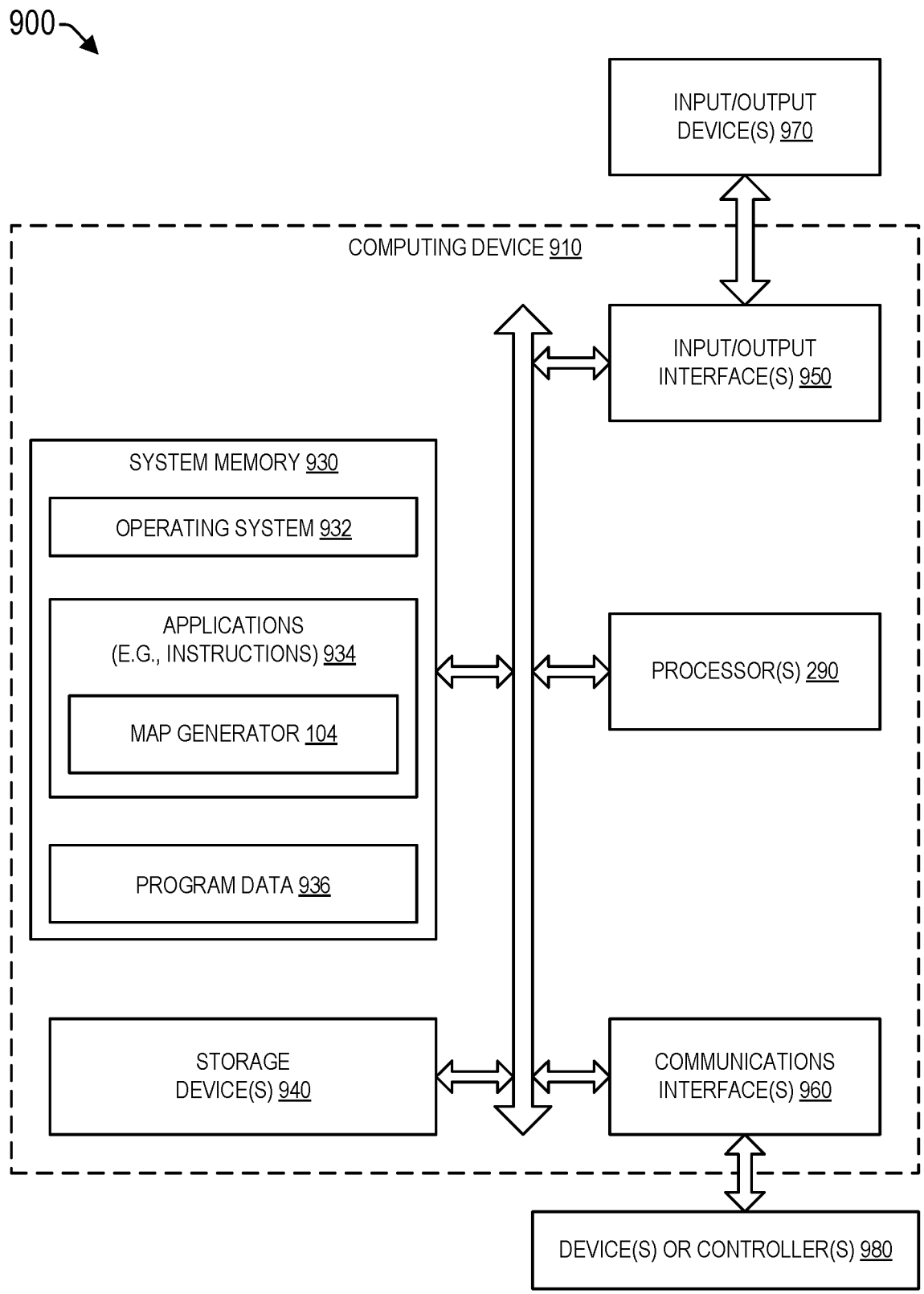
FIG. 9 is a block diagram of a computing environment including a computing device configured to support aspects of computer-implemented methods and computer-executable program instructions (or code) according to the present disclosure.

FIG. 9 is a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIGS. 1-8.

The computing device 910 includes the one or more processors 290. The one or more processors 290 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system (program) data 936, such as data used or generated by the map generator 104.

The system memory 930 includes one or more applications 934 (e.g., sets of instructions) executable by the one or more processors 290. As an example, the one or more applications 934 include the instructions 294 executable by the one or more processors 290 to initiate, control, or perform one or more operations described with reference to FIGS. 1-8. To illustrate, the one or more applications 934 include the instructions 294 executable by the one or more processors 290 to initiate, control, or perform one or more operations described with reference to the map generator 104.

In a particular implementation, the system memory 930 includes a non-transitory, computer readable medium storing the instructions 294 that, when executed by the one or more processors 290, cause the one or more processors 290 to determine a first label location (e.g., the label location 122A) of a first label (e.g., the label 112A) that identifies a first map location (e.g., the map location 128A). The instructions, when executed by the one or more processors, also cause the one or more processors to determine a first label location (e.g., the label location 122B) of a second label (e.g., the label 112B) that identifies a second map location (e.g., the map location 128B). The instructions, when executed by the one or more processors, further cause the one or more processors to determine, based on the first label location of the first label, a first bounding box (e.g., the bounding box 124A) of the first label. The instructions, when executed by the one or more processors, also cause the one or more processors to determine, based on the first label location of the second label, a first bounding box (e.g., the bounding box 124B) of the second label. The instructions, when executed by the one or more processors, further cause the one or more processors to determine whether the first bounding box of the first label overlaps the first bounding box of the second label. The instructions, when executed by the one or more processors, also cause the one or more processors to, based on determining that the first bounding box of the first label overlaps the first bounding box of the second label, determine a first candidate label location (e.g., the candidate label location 126A) of the first label and a first candidate label location (e.g., the candidate label location 126B) of the second label based on an intersection of the first bounding box of the first label and the first bounding box of the second label. The instructions, when executed by the one or more processors, further cause the one or more processors to, based on determining that the first candidate label location of the first label satisfies a first selection criterion and that the first candidate label location of the second label satisfies a second selection criterion, generate a map (e.g., the map 119) including the first label at the first candidate label location of the first label and the second label at the first candidate label location of the second label.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible computer-readable media. In a particular aspect, one or more of the storage devices 940 are external to the computing device 910.

The one or more input/output interfaces 950 enable the computing device 910 to communicate with one or more input/output devices 970 to facilitate user interaction. For example, the one or more input/output interfaces 950 can include a display interface, an input interface, or both. For example, the input/output interface 950 is adapted to receive input from a user, to receive input from another computing device, or a combination thereof. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 970 includes one or more user interface devices and displays, including some combination of buttons, keyboards, pointing devices, displays, speakers, microphones, touch screens, and other devices.

The one or more processors 290 are configured to communicate with devices or controllers 980 via the one or more communications interfaces 960. For example, the one or more communications interfaces 960 can include a network interface. The devices or controllers 980 can include, for example, a user device, a display device, one or more other devices, or any combination thereof.

In conjunction with the described systems and methods, an apparatus for adjusting locations of map labels is disclosed that includes means for determining a first label location of a first label that identifies a first map location. In some implementations, the means for determining the first label location of the first label corresponds to the map generator 104 of FIG. 1, the label location generator 214, the one or more processors 290, the device 202, the system 200 of FIG. 2, the computing device 910, one or more other circuits or devices configured to determine the first label location of the first label, or a combination thereof.

The apparatus also includes means for determining a first label location of a second label that identifies a second map location. In some implementations, the means for determining the first label location of the second label corresponds to the map generator 104 of FIG. 1, the label location generator 214, the one or more processors 290, the device 202, the system 200 of FIG. 2, the computing device 910, one or more other circuits or devices configured to determine the first label location of the second label, or a combination thereof.

The apparatus further includes means for determining a first bounding box of the first label based on the first label location of the first label. In some implementations, the means for determining the first bounding box of the first label corresponds to the map generator 104 of FIG. 1, the bounding box generator 216, the one or more processors 290, the device 202, the system 200 of FIG. 2, the computing device 910, one or more other circuits or devices configured to determine the first bounding box of the first label, or a combination thereof.

The apparatus also includes means for determining a first bounding box of the second label based on the first label location of the second label. In some implementations, the means for determining the first bounding box of the second label corresponds to the map generator 104 of FIG. 1, the bounding box generator 216, the one or more processors 290, the device 202, the system 200 of FIG. 2, the computing device 910, one or more other circuits or devices configured to determine the first bounding box of the second label, or a combination thereof.

The apparatus further includes means for determining whether the first bounding box of the first label overlaps the first bounding box of the second label. In some implementations, the means for determining whether the first bounding box of the first label overlaps the first bounding box of the second label corresponds to the map generator 104 of FIG. 1, the conflict analyzer 218, the one or more processors 290, the device 202, the system 200 of FIG. 2, the conflict detector 612 of FIG. 6A, the computing device 910, one or more other circuits or devices configured to determine whether the first bounding box of the first label overlaps the first bounding box of the second label, or a combination thereof.

The apparatus also includes means for determining a first candidate label location of the first label and a first candidate label location of the second label based on an intersection of the first bounding box of the first label and the first bounding box of the second label, the first candidate label location and the second candidate label location determined based on determining that the first bounding box of the first label overlaps the first bounding box of the second label. In some implementations, the means for determining the first candidate label location of the first label and the first candidate label location of the second label corresponds to the map generator 104 of FIG. 1, the conflict analyzer 218, the one or more processors 290, the device 202, the system 200 of FIG. 2, the deconflictor 614 of FIG. 6A, the computing device 910, one or more other circuits or devices configured to determine the first candidate label location of the first label and the first candidate label location of the second label, or a combination thereof.

The apparatus further includes means for generating a map including the first label at the first candidate label location of the first label and the second label at the first candidate label location of the second label, the map generated based on determining that the first candidate label location of the first label satisfies a first selection criterion and that the first candidate label location of the second label satisfies a second selection criterion. In some implementations, the means for generating the map corresponds to the map generator 104 of FIG. 1, the conflict analyzer 218, the one or more processors 290, the device 202, the system 200 of FIG. 2, the selection criterion analyzer 616 of FIG. 6A, the computing device 910, one or more other circuits or devices configured to generate the map, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-8. In some implementations, part or all of one or more of the operations or methods of FIGS. 1-8 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a device includes: one or more processors configured to: determine a first label location of a first label that identifies a first map location; determine a first label location of a second label that identifies a second map location; determine, based on the first label location of the first label, a first bounding box of the first label; determine, based on the first label location of the second label, a first bounding box of the second label; determine whether the first bounding box of the first label overlaps the first bounding box of the second label; based on determining that the first bounding box of the first label overlaps the first bounding box of the second label, determine a first candidate label location of the first label and a first candidate label location of the second label based on an intersection of the first bounding box of the first label and the first bounding box of the second label; and based on determining that the first candidate label location of the first label satisfies a first selection criterion and that the first candidate label location of the second label satisfies a second selection criterion, generate a map including the first label at the first candidate label location of the first label and the second label at the first candidate label location of the second label.

Example 2 includes the device of Example 1, wherein the one or more processors are configured to: determine a movement offset based on dimensions of the intersection; determine the first candidate label location of the first label based on the first label location of the first label and the movement offset; and determine the first candidate label location of the second label based on the first label location of the second label and the movement offset.

Example 3 includes the device of Example 1 or Example 2, wherein the one or more processors are configured to apply a first portion of a movement offset to the first label location of the first label to determine the first candidate label location of the first label, the movement offset based on dimensions of the intersection.

Example 4 includes the device of Example 3, wherein the first portion is based at least in part on a first label type of the first label.

Example 5 includes the device of Example 4, wherein the first label type includes a navigation aid (navaid) label type, a way point label type, a route label type, an airport label type, an airway label type, or an airspace label type.

Example 6 includes the device of any of Example 1 to Example 5, wherein the one or more processors are configured to: determine, based on the first candidate label location of the first label, a first candidate bounding box of the first label; and based at least in part on determining that the first candidate bounding box of the first label is within a threshold distance of the first map location, determine that the first candidate label location of the first label satisfies the first selection criterion.

Example 7 includes the device of Example 6, wherein the threshold distance is based on a zoom level of the map.

Example 8 includes the device of Example 6, wherein the one or more processors are configured to, based on determining that the first candidate bounding box of the first label exceeds the threshold distance of the first map location, determine a second candidate label location of the first label and a second candidate label location of the second label based on the first candidate bounding box of the first label and the first candidate bounding box of the second label.

Example 9 includes the device of Example 8, wherein the one or more processors are configured to, based on determining that the second candidate label location of the first label satisfies the first selection criterion and the second candidate label location of the second label satisfies the second selection criterion, generate the map including the first label at the second candidate label location of the first label and the second label at the second candidate label location of the second label.

Example 10 includes the device of Example 9, wherein the one or more processors are configured to: determine, based on the second candidate label location of the first label, a second candidate bounding box of the first label; and based at least in part on determining that the second candidate bounding box of the first label is within a threshold distance of the first map location, determine that the second candidate label location of the first label satisfies the first selection criterion.

Example 11 includes the device of Example 6, wherein the one or more processors are configured to, based on determining that the first candidate bounding box of the first label is within the threshold distance of the first map location and that the first candidate bounding box of the first label overlaps a first candidate bounding box of a third label that identifies a third map location, determine a second candidate label location of the first label and a second candidate label location of the third label based on the first candidate bounding box of the first label and the first candidate bounding box of the third label.

Example 12 includes the device of Example 11, wherein the one or more processors are configured to, based on determining that the second candidate label location of the first label satisfies the first selection criterion, that the first candidate label location of the second label satisfies the second selection criterion, and that the second candidate label location of the third label satisfies a third selection criterion, generate the map including the first label at the second candidate label location of the first label, the second label at the first candidate label location of the second label, and the third label at the second candidate label location of the third label.

Example 13 includes the device of Example 12, wherein the one or more processors are configured to: determine, based on the second candidate label location of the third label, a second candidate bounding box of the third label; and based at least in part on determining that the second candidate bounding box of the third label is within a threshold distance of the third map location, determine that the second candidate label location of the third label satisfies the third selection criterion.

Example 14 includes the device of any of Example 1 to Example 13, wherein the one or more processors are configured to: determine, based on the first candidate label location of the first label, a first candidate bounding box of the first label; and based at least in part on determining that the first candidate bounding box of the first label does not overlap any other bounding boxes of other labels, determine that the first candidate label location of the first label satisfies the first selection criterion.

Example 15 includes the device of any of Example 1 to Example 14, wherein the one or more processors are configured to: determine that a plurality of label types is associated with a zoom level of the map; select a first set of labels from a plurality of labels, each label of the first set of labels having a label type that is included in the plurality of label types, wherein the first set of labels includes the first label and the second label; and generate the map including the first set of labels.

Example 16 includes the device of any of Example 1 to Example 15, wherein the first bounding box of the first label is based on a font size of the first label, text of the first label, a zoom level of the map, or a combination thereof.

Example 17 includes the device of any of Example 1 to Example 16, wherein the first label location of the first label is based on default data.

Example 18 includes the device of any of Example 1 to Example 17, wherein the one or more processors are configured to determine the first label location based on a label offset and the first map location, wherein the label offset includes a distance offset, a direction offset, or both.

According to Example 19, a method includes: determining, at a device, a first label location of a first label that identifies a first map location; determining, at the device, a first label location of a second label that identifies a second map location; determining, based on the first label location of the first label, a first bounding box of the first label; determining, based on the first label location of the second label, a first bounding box of the second label; determining, at the device, whether the first bounding box of the first label overlaps the first bounding box of the second label; based on determining that the first bounding box of the first label overlaps the first bounding box of the second label, determining a first candidate label location of the first label and a first candidate label location of the second label based on an intersection of the first bounding box of the first label and the first bounding box of the second label; and based on determining that the first candidate label location of the first label satisfies a first selection criterion and that the first candidate label location of the second label satisfies a second selection criterion, generating a map including the first label at the first candidate label location of the first label and the second label at the first candidate label location of the second label.

Example 20 includes the method of Example 19, further including: determining a movement offset based on dimensions of the intersection; determining the first candidate label location of the first label based on the first label location of the first label and the movement offset; and determining the first candidate label location of the second label based on the first label location of the second label and the movement offset.

Example 21 includes the method of Example 19 or Example 20, further including applying a first portion of a movement offset to the first label location of the first label to determine the first candidate label location of the first label, the movement offset based on dimensions of the intersection.

Example 22 includes the method of Example 21, wherein the first portion is based at least in part on a first label type of the first label.

Example 23 includes the method of Example 22, wherein the first label type includes a navigation aid (navaid) label type, a way point label type, a route label type, an airport label type, an airway label type, or an airspace label type.

Example 24 includes the method of any of Example 19 to Example 23, further including: determining, based on the first candidate label location of the first label, a first candidate bounding box of the first label; and based at least in part on determining that the first candidate bounding box of the first label is within a threshold distance of the first map location, determining that the first candidate label location of the first label satisfies the first selection criterion.

Example 25 includes the method of Example 24, wherein the threshold distance is based on a zoom level of the map.

Example 26 includes the method of Example 24, further including, based on determining that the first candidate bounding box of the first label exceeds the threshold distance of the first map location, determining a second candidate label location of the first label and a second candidate label location of the second label based on the first candidate bounding box of the first label and the first candidate bounding box of the second label.

Example 27 includes the method of Example 26, further including, based on determining that the second candidate label location of the first label satisfies the first selection criterion and the second candidate label location of the second label satisfies the second selection criterion, generating the map including the first label at the second candidate label location of the first label and the second label at the second candidate label location of the second label.

Example 28 includes the method of Example 27, further including: determining, based on the second candidate label location of the first label, a second candidate bounding box of the first label; and based at least in part on determining that the second candidate bounding box of the first label is within a threshold distance of the first map location, determining that the second candidate label location of the first label satisfies the first selection criterion.

Example 29 includes the method of Example 24, further including, based on determining that the first candidate bounding box of the first label is within the threshold distance of the first map location and that the first candidate bounding box of the first label overlaps a first candidate bounding box of a third label that identifies a third map location, determining a second candidate label location of the first label and a second candidate label location of the third label based on the first candidate bounding box of the first label and the first candidate bounding box of the third label.

Example 30 includes the method of Example 29, further including, based on determining that the second candidate label location of the first label satisfies the first selection criterion, that the first candidate label location of the second label satisfies the second selection criterion, and that the second candidate label location of the third label satisfies a third selection criterion, generating the map including the first label at the second candidate label location of the first label, the second label at the first candidate label location of the second label, and the third label at the second candidate label location of the third label.

Example 31 includes the method of Example 30, further including: determining, based on the second candidate label location of the third label, a second candidate bounding box of the third label; and based at least in part on determining that the second candidate bounding box of the third label is within a threshold distance of the third map location, determining that the second candidate label location of the third label satisfies the third selection criterion.

Example 32 includes the method of any of Example 19 to Example 31, further including: determining, based on the first candidate label location of the first label, a first candidate bounding box of the first label; and based at least in part on determining that the first candidate bounding box of the first label does not overlap any other bounding boxes of other labels, determining that the first candidate label location of the first label satisfies the first selection criterion.

Example 33 includes the method of any of Example 19 to Example 32, further including: determining that a plurality of label types is associated with a zoom level of the map; select a first set of labels from a plurality of labels, each label of the first set of labels having a label type that is included in the plurality of label types, wherein the first set of labels includes the first label and the second label; and generating the map including the first set of labels.

Example 34 includes the method of any of Example 19 to Example 33, wherein the first bounding box of the first label is based on a font size of the first label, text of the first label, a zoom level of the map, or a combination thereof.

Example 35 includes the method of any of Example 19 to Example 34, wherein the first label location of the first label is based on default data.

Example 36 includes the method of any of Example 19 to Example 35, further including determining, at the device, the first label location based on a label offset and the first map location, wherein the label offset includes a distance offset, a direction offset, or both.

According to Example 37, a device includes: a memory configured to store instructions; and a processor configured to execute the instructions to perform the method of any of Example 19 to 36.

According to Example 38, a non-transitory computer-readable medium stores instructions that, when executed by a processor, cause the processor to perform the method of any of Example 19 to Example 36.

According to Example 39, an apparatus includes means for carrying out the method of any of Example 19 to Example 36.

According to Example 40, a non-transitory computer-readable medium stores instructions that, when executed by one or more processors, cause the one or more processors to: determine a first label location of a first label that identifies a first map location; determine a first label location of a second label that identifies a second map location; determine, based on the first label location of the first label, a first bounding box of the first label; determine, based on the first label location of the second label, a first bounding box of the second label; determine whether the first bounding box of the first label overlaps the first bounding box of the second label; based on determining that the first bounding box of the first label overlaps the first bounding box of the second label, determine a first candidate label location of the first label and a first candidate label location of the second label based on an intersection of the first bounding box of the first label and the first bounding box of the second label; and based on determining that the first candidate label location of the first label satisfies a first selection criterion and that the first candidate label location of the second label satisfies a second selection criterion, generate a map including the first label at the first candidate label location of the first label and the second label at the first candidate label location of the second label.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
one or more processors configured to:
   determine a first label location of a first label that identifies a first map location;
   determine a first label location of a second label that identifies a second map location;
   determine, based on the first label location of the first label, a first bounding box of the first label;
   determine, based on the first label location of the second label, a first bounding box of the second label;
   determine whether the first bounding box of the first label overlaps the first bounding box of the second label;
   based on determining that the first bounding box of the first label overlaps the first bounding box of the second label, determine a first candidate label location of the first label and a first candidate label location of the second label based on an intersection of the first bounding box of the first label and the first bounding box of the second label;

determine, based on the first candidate label location of the first label, a first candidate bounding box of the first label;

based at least in part on determining that the first candidate bounding box of the first label is within a threshold distance of the first map location, determine that the first candidate label location of the first label satisfies a first selection criterion; and based on determining that the first candidate label location of the first label satisfies the first selection criterion and that the first candidate label location of the second label satisfies a second selection criterion, generate a map including the first label at the first candidate label location of the first label and the second label at the first candidate label location of the second label.

2. The device of claim 1, wherein the one or more processors are configured to:

determine a movement offset based on dimensions of the intersection;

determine the first candidate label location of the first label based on the first label location of the first label and the movement offset; and determine the first candidate label location of the second label based on the first label location of the second label and the movement offset.

3. The device of claim 1, wherein the one or more processors are configured to apply a first portion of a movement offset to the first label location of the first label to determine the first candidate label location of the first label, the movement offset based on dimensions of the intersection.

4. The device of claim 3, wherein the first portion is based at least in part on a first label type of the first label.

5. The device of claim 4, wherein the first label type includes a navigation aid (navaid) label type, a way point label type, a route label type, an airport label type, an airway label type, or an airspace label type.

6. The device of claim 4, wherein the threshold distance is based on the first label type of the first label.

7. The device of claim 1, wherein the threshold distance is based on a zoom level of the map.

8. The device of claim 1, wherein the one or more processors are configured to, based on determining that the first candidate bounding box of the first label exceeds the threshold distance of the first map location, determine a second candidate label location of the first label and a second candidate label location of the second label based on the first candidate bounding box of the first label and the first candidate bounding box of the second label.

9. The device of claim 8, wherein the one or more processors are configured to, based on determining that the second candidate label location of the first label satisfies the first selection criterion and the second candidate label location of the second label satisfies the second selection criterion, generate the map including the first label at the second candidate label location of the first label and the second label at the second candidate label location of the second label.

10. The device of claim 9, wherein the one or more processors are configured to:

determine, based on the second candidate label location of the first label, a second candidate bounding box of the first label; and based at least in part on determining that the second candidate bounding box of the first label is within the threshold distance of the first map location, determine that the second candidate label location of the first label satisfies the first selection criterion.

11. The device of claim 1, wherein the one or more processors are configured to, based on determining that the first candidate bounding box of the first label is within the threshold distance of the first map location and that the first candidate bounding box of the first label overlaps a first candidate bounding box of a third label that identifies a third map location, determine a second candidate label location of the first label and a second candidate label location of the third label based on the first candidate bounding box of the first label and the first candidate bounding box of the third label.

12. The device of claim 11, wherein the one or more processors are configured to, based on determining that the second candidate label location of the first label satisfies the first selection criterion, that the first candidate label location of the second label satisfies the second selection criterion, and that the second candidate label location of the third label satisfies a third selection criterion, generate the map including the first label at the second candidate label location of the first label, the second label at the first candidate label location of the second label, and the third label at the second candidate label location of the third label.

13. The device of claim 12, wherein the one or more processors are configured to:

determine, based on the second candidate label location of the third label, a second candidate bounding box of the third label; and based at least in part on determining that the second candidate bounding box of the third label is within a threshold distance of the third map location, determine that the second candidate label location of the third label satisfies the third selection criterion.

14. The device of claim 1, wherein the one or more processors are configured to, based at least in part on determining that the first candidate bounding box of the first label does not overlap any other bounding boxes of other labels, determine that the first candidate label location of the first label satisfies the first selection criterion.

15. The device of claim 1, wherein the one or more processors are configured to:

determine that a plurality of label types is associated with a zoom level of the map;

select a first set of labels from a plurality of labels, each label of the first set of labels having a label type that is included in the plurality of label types, wherein the first set of labels includes the first label and the second label; and generate the map including the first set of labels.

16. The device of claim 1, wherein the first bounding box of the first label is based on a font size of the first label, text of the first label, a zoom level of the map, or a combination thereof.

17. The device of claim 1, wherein the first label location of the first label is based on default data.

18. A method comprising:

determining, at a device, a first label location of a first label that identifies a first map location;

determining, at the device, a first label location of a second label that identifies a second map location;

determining, based on the first label location of the first label, a first bounding box of the first label;

determining, based on the first label location of the second label, a first bounding box of the second label;

determining, at the device, whether the first bounding box of the first label overlaps the first bounding box of the second label;

based on determining that the first bounding box of the first label overlaps the first bounding box of the second label, determining a first candidate label location of the first label and a first candidate label location of the second label based on an intersection of the first bounding box of the first label and the first bounding box of the second label;

determining, based on the first candidate label location of the first label, a first candidate bounding box of the first label;

based at least in part on determining that the first candidate bounding box of the first label is within a threshold distance of the first map location, determining that the first candidate label location of the first label satisfies a first selection criterion; and based on determining that the first candidate label location of the first label satisfies the first selection criterion and that the first candidate label location of the second label satisfies a second selection criterion, generating a map including the first label at the first candidate label location of the first label and the second label at the first candidate label location of the second label.

19. The method of claim 18, further comprising determining, at the device, the first label location based on a label offset and the first map location, wherein the label offset includes a distance offset, a direction offset, or both.

20. A non-transitory computer-readable medium storing instructions that, when executed by one or more processors, cause the one or more processors to:

determine a first label location of a first label that identifies a first map location;

determine a first label location of a second label that identifies a second map location;

determine, based on the first label location of the first label, a first bounding box of the first label;

determine, based on the first label location of the second label, a first bounding box of the second label;

determine whether the first bounding box of the first label overlaps the first bounding box of the second label;

based on determining that the first bounding box of the first label overlaps the first bounding box of the second label, determine a first candidate label location of the first label and a first candidate label location of the second label based on an intersection of the first bounding box of the first label and the first bounding box of the second label;

determine, based on the first candidate label location of the first label, a first candidate bounding box of the first label;

based at least in part on determining that the first candidate bounding box of the first label is within a threshold distance of the first map location, determine that the first candidate label location of the first label satisfies a first selection criterion; and based on determining that the first candidate label location of the first label satisfies the first selection criterion and that the first candidate label location of the second label satisfies a second selection criterion, generate a map including the first label at the first candidate label location of the first label and the second label at the first candidate label location of the second label.

\* \* \* \* \*